(12) United States Patent
Lee

(10) Patent No.: US 11,631,509 B2
(45) Date of Patent: Apr. 18, 2023

(54) DOUBLE-LAYER LONGITUDINAL WRAPPING MOLD

(71) Applicant: James Cheng Lee, La Habra, CA (US)

(72) Inventor: James Cheng Lee, La Habra, CA (US)

( * ) Notice: Subject to any disclaimer, the term of this patent is extended or adjusted under 35 U.S.C. 154(b) by 0 days.

(21) Appl. No.: 17/548,781

(22) Filed: Dec. 13, 2021

(65) Prior Publication Data

US 2022/0223322 A1    Jul. 14, 2022

Related U.S. Application Data

(60) Provisional application No. 63/134,982, filed on Jan. 8, 2021.

(30) Foreign Application Priority Data

Nov. 22, 2021    (CN) .......................... 202111383108.X

(51) Int. Cl.
*H01B 13/10*  (2006.01)
*B29C 53/80*  (2006.01)
*B29C 53/56*  (2006.01)
*B29K 27/18*  (2006.01)
*B29L 31/34*  (2006.01)

(52) U.S. Cl.
CPC ........... *H01B 13/10* (2013.01); *B29C 53/562* (2013.01); *B29C 53/8008* (2013.01); *B29K 2027/18* (2013.01); *B29K 2995/0005* (2013.01); *B29K 2995/0007* (2013.01); *B29L 2031/3462* (2013.01)

(58) Field of Classification Search
CPC .... H01B 13/0858; H01B 13/08; H01B 13/10; H01B 13/2613; B29C 53/52; B29C 53/48
USPC ....................................................... 156/53, 56
See application file for complete search history.

(56) References Cited

U.S. PATENT DOCUMENTS 4,252,584 A * 2/1981 Garner ................. H01B 13/262
                                                                156/461
6,637,488 B2 * 10/2003 Okamura ............. H01B 13/266
                                                                156/468

* cited by examiner

*Primary Examiner* — Carson Gross
(74) *Attorney, Agent, or Firm* — Lin & Associates Intellectual Property, Inc.

(57) ABSTRACT

A double-layer longitudinal wrapping mold is disclosed, including a base, a first longitudinal wrapping structure, a first pressing structure, a second longitudinal wrapping structure, a second pressing structure and a first necking structure. The first longitudinal wrapping structure is disposed on the base and has a first guide hole, a first outer layer wrapping hole and an inner layer wrapping hole. The first pressing structure is disposed on the base and has a first pressing hole and a second outer layer wrapping tape hole. The second longitudinal wrapping structure is disposed on the base and has a second guide hole and a third outer layer wrapping tape hole. The second pressing structure is disposed on the base and has a second pressing hole and a fourth outer layer wrapping tape hole. The first necking structure is disposed on the base and has a necking hole.

10 Claims, 24 Drawing Sheets

DOUBLE-LAYER LONGITUDINAL WRAPPING MOLD

BACKGROUND OF THE INVENTION

1. Field of the Invention

The present invention relates generally to a mold, in particular to a double-layer longitudinal wrapping mold for covering the outer surface of the conductor with two layers of tapes in a longitudinal wrapping manner.

2. The Prior Arts

Generally, a cable includes a conductor and an insulating layer. The insulating layer covers the outer surface of the conductor. The insulating layer can protect the conductor and provide an insulating effect.

The conventional cable manufacturing methods include extrusion molding and wrapping. The extrusion molding method is: an insulating material is extruded and molded on the outer surface of a conductor, and the insulating material forms an insulating layer to form a cable. As shown in FIG. 19, the wrapping method is as follows: an insulating tape is wound on the outer surface of a conductor, and the insulating tape forms an insulating layer to form a cable.

To reduce the insertion loss (dB) in applications that demand transmission efficiency in high-speed cables, it is usually necessary to use a material with a lower dielectric constant as an insulating layer, such as polypropylene (PP), Polyethylene (PE), perfluoroalkoxy (PFA), Fluorinated ethylene propylene (FEP) and Polytetrafluoroethene (PTFE), and other insulating materials. The insulating material of extrusion molding method is more often made of PP, PE, FEP, PFA, and the insulating tape of the wrapping method is often made of PTFE and other materials.

However, the problem with the extrusion molding method is that the dielectric constant of the insulating layer has a great impact on the performance of high-frequency/high-speed transmission. Therefore, foaming materials are usually used to reduce the dielectric constant, but the foaming materials often do not meet the distribution and yield standards during the manufacturing process.

Although the wrapping method can solve the problem of the extrusion molding method, however, because the insulating tape made of PTFE is relatively soft, it is difficult for the wrapping device to control the tension of the insulating tape wound on the conductor. If the wrapping device pulls the insulating tape too tightly, the insulating tape is easily stretched and deformed to generate wrinkles. If the wrapping device pulls the insulating tape too loosely, the covering effect of the insulating tape is poor and cannot be closely adhered to the conductor, resulting in slipping between the insulating tape and the conductor. As shown in FIG. 20, the insulation layer is obviously deformed and wrinkled, the roundness is poor, the conductor is eccentric, and the concentricity of the cable is poor. The above-mentioned problems will cause the electrical and mechanical properties of the cable to deteriorate.

SUMMARY OF THE INVENTION

The primary objective of the present invention is to provide a double-layer longitudinal wrapping mold that can provide a first wrapping tape to cover the outer surface of the conductor in a longitudinal wrapping manner, while providing a second wrapping tape to cover the outer surface of the first wrapping tape in a longitudinal wrapping manner; the first wrapping tape and the second wrapping tape are prevented from being wrinkled.

In order to achieve the foregoing objective, the present invention provides a double-layer longitudinal wrapping mold, including a base, a first longitudinal wrapping structure, a first pressing structure, a second longitudinal wrapping structure, a second pressing structure, and a first necking structure.

The base has an inlet end and an outlet end.

The first longitudinal wrapping structure is disposed on the base, close to the inlet end of the base, and is provided with a first guide hole, a first outer layer wrapping tape hole, and an inner layer wrapping tape hole; the first guide hole penetrates through both ends of the first longitudinal wrapping structure, the first outer wrapping tape hole penetrates through both ends of the first longitudinal wrapping structure and is located on one side of the first guide hole, and the inner wrapping tape hole penetrates through both ends of the first longitudinal wrapping structure, is located at the other side of the first guide hole, and is wound sideways.

The first pressing structure is disposed on the base, between the first longitudinal wrapping structure and the outlet end of the base, and is disposed with a first pressing hole and a second outer layer wrapping tape hole; the first pressing hole penetrates through both ends of the first pressing structure and has a diameter smaller than the diameter of the first guide hole, the second outer layer wrapping tape hole penetrates through both ends of the first pressing structure and is located on one side of the first pressing hole.

The second longitudinal wrapping structure is disposed on the base, located between the first pressing structure and the outlet end of the base, and is disposed with a second guide hole and a third outer layer wrapping tape hole; the second guide hole penetrates through both ends of the second longitudinal wrapping structure and has a diameter equal to the diameter of the first guide hole, and the third outer layer wrapping tape hole penetrates through both ends of the second longitudinal wrapping structure, is located on one side of the second guide hole, and is wound sideway.

The second pressing structure is disposed on the base, located between the second longitudinal wrapping structure and the outlet end of the base, and is disposed with a second pressing hole and a fourth outer layer wrapping tape hole; the second pressing hole penetrates through both ends of the second pressing structure and has a diameter equal to the diameter of the first guide hole, the fourth outer layer wrapping tape hole penetrates through a front end of the second pressing structure, is located on the other side of the second pressing hole, and is wound sideway, with one side penetrating an inner wall of the second pressing hole.

The first necking structure is disposed on the base, close to the outlet end of the base, and is disposed with a necking hole; the necking hole of the first necking structure penetrates through both ends of the first necking structure and has a diameter tapered from its inlet end toward its outlet end, with the diameter of the inlet end of the necking hole of the first necking structure equal to the diameter of the first guide hole.

The effect of the present invention is that the double-layer longitudinal wrapping mold of the present invention can provide the first wrapping tape to be longitudinally wrapped on the outer surface of the conductor, while providing the second wrapping tape to cover the outer surface of the first longitudinal wrapping tape, and the first wrapping tape and the second wrapping tape are prevented from being wrinkled. Therefore, the first wrapping tape and the second wrapping tape are flat, which improves the fit and covering effect of the combination of the first wrapping tape and the second wrapping tape with the conductor.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
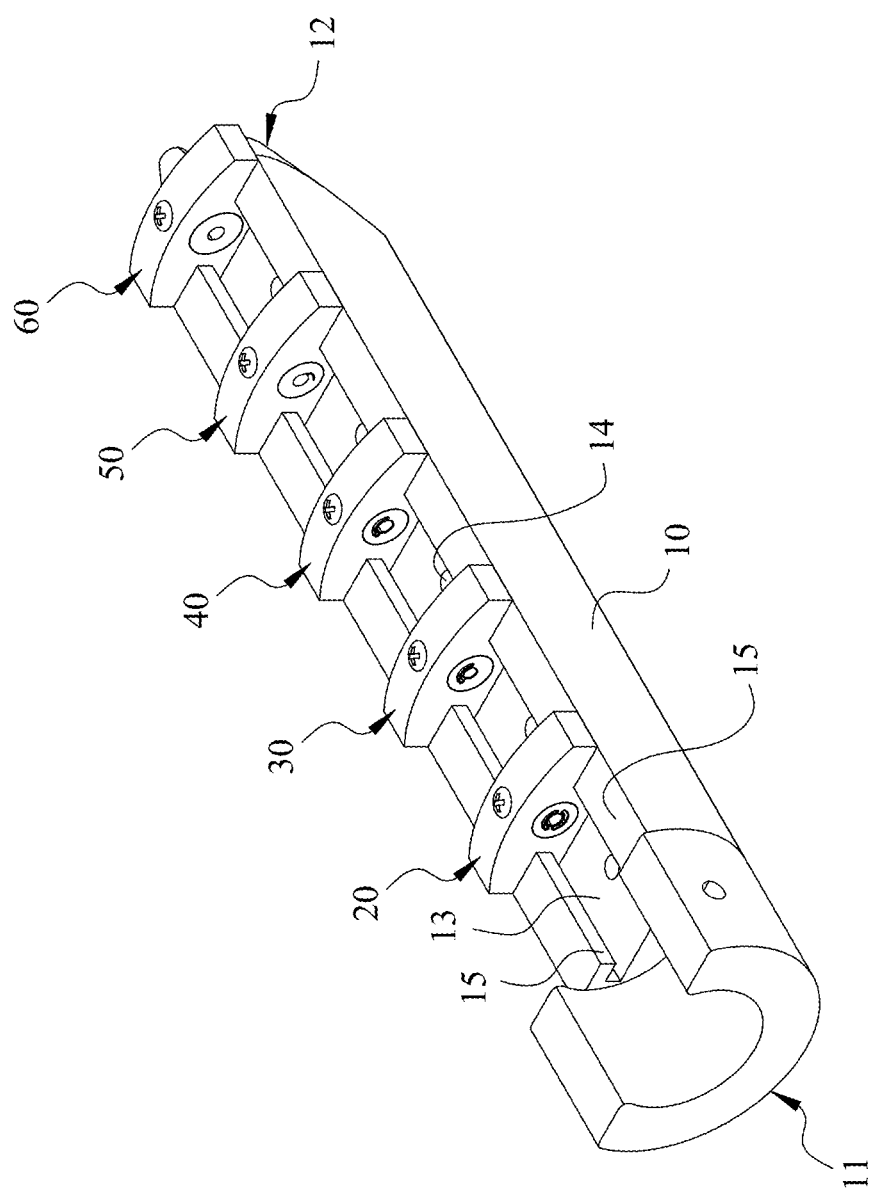
FIG. 1 is a perspective view of the first embodiment of the double-layer longitudinal wrapping mold of the present invention.
Figure 2:
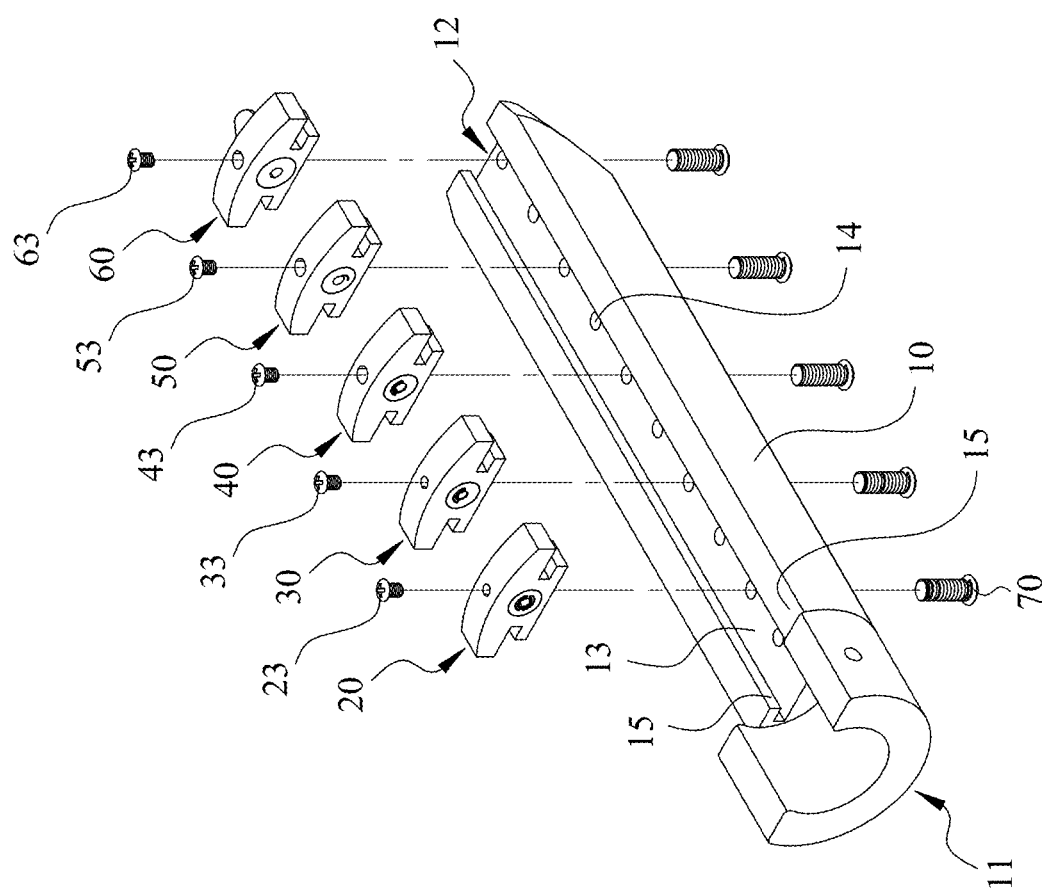
FIG. 2 is an exploded view of the first embodiment of the double-layer longitudinal wrapping mold of the present invention.
Figure 3A:
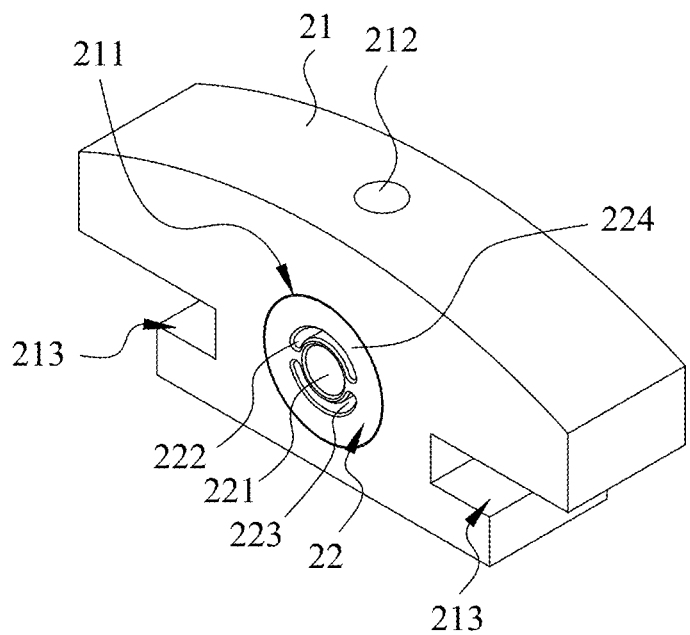
FIG. 3A is a perspective view of the first longitudinal wrapping structure of the present invention.
Figure 3B:
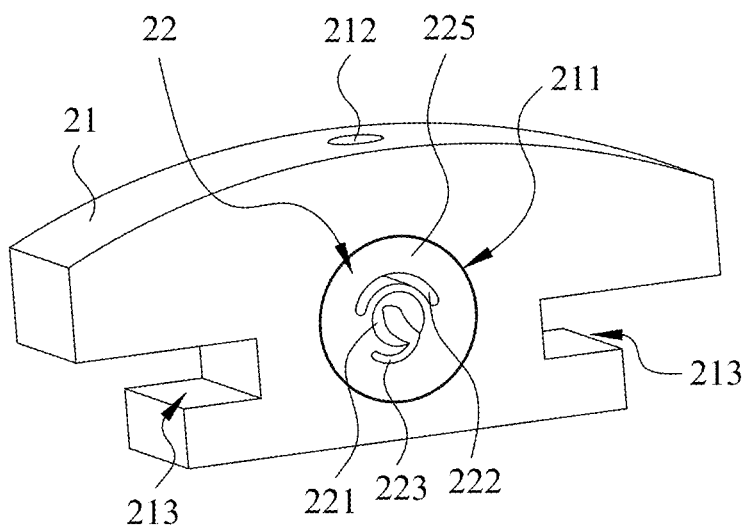
FIG. 3B is a schematic view from another angle of the first longitudinal wrapping structure of the present invention.
Figure 3C:
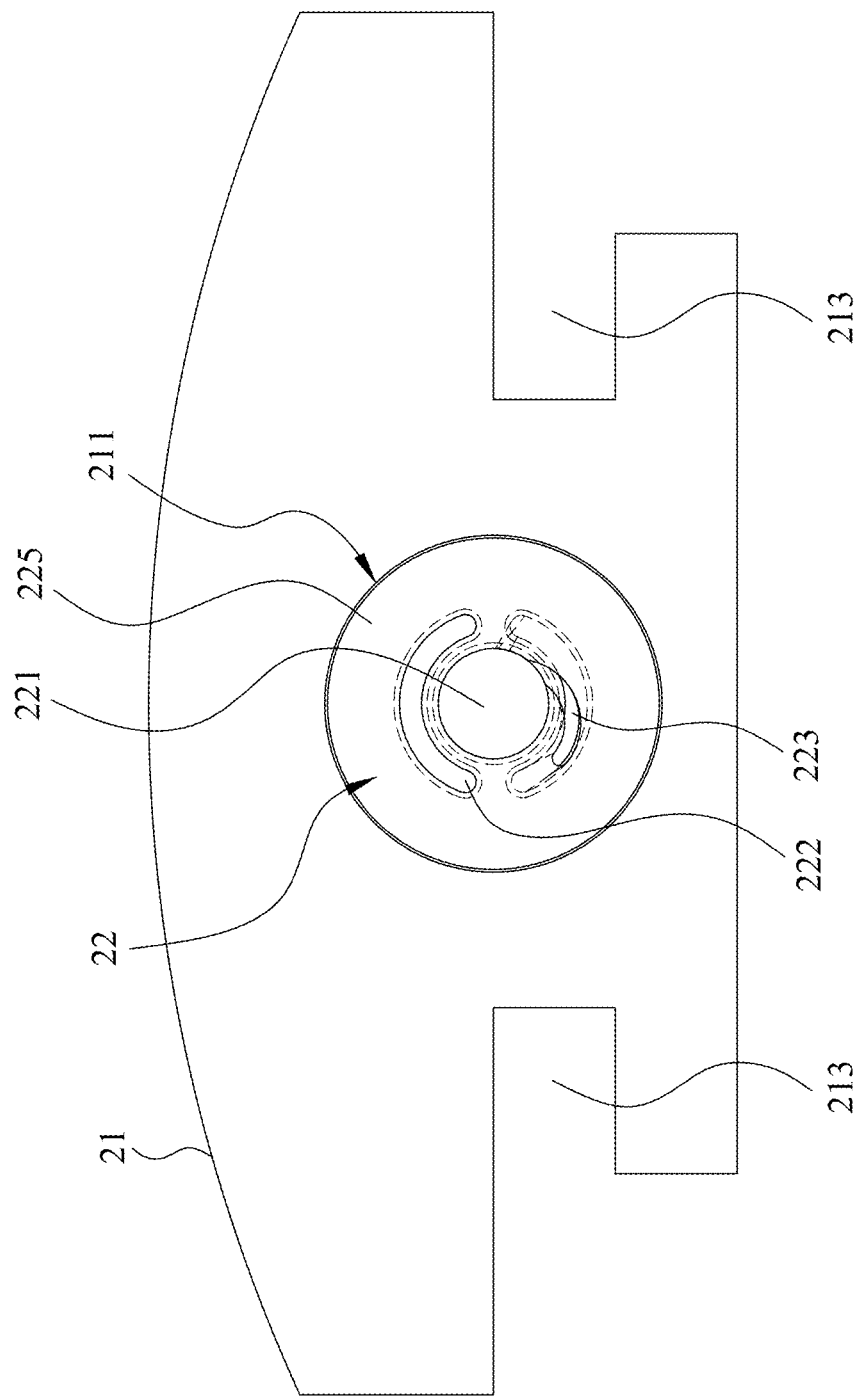
FIG. 3C is a rear view of the first longitudinal wrapping structure of the present invention.
Figure 4A:
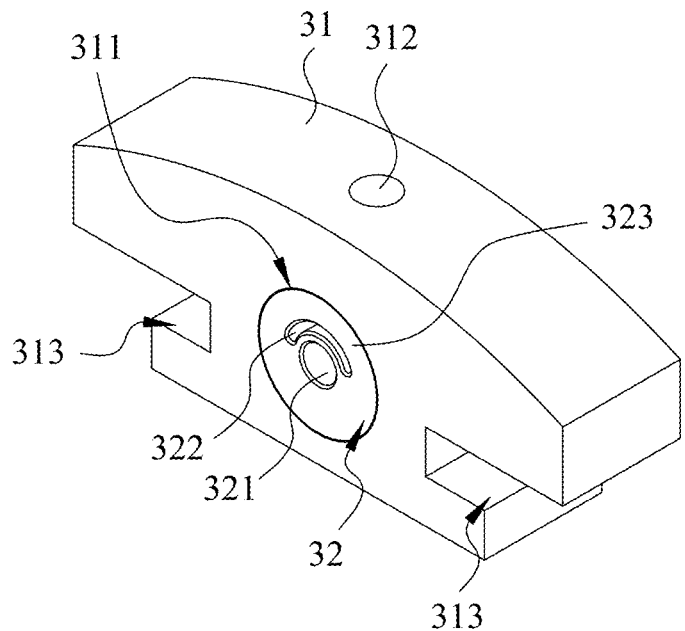
FIG. 4A is a perspective view of the first pressing structure of the present invention.
Figure 4B:
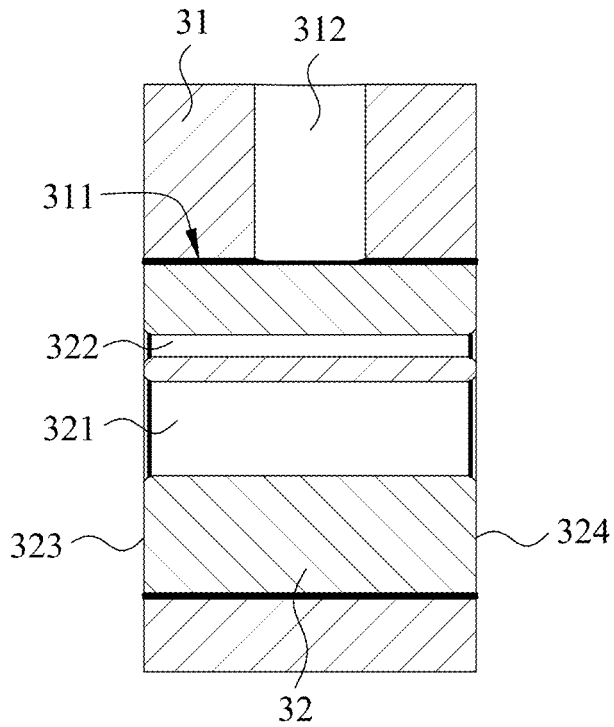
FIG. 4B is a cross-sectional view of the first pressing structure of the present invention.
Figure 5A:
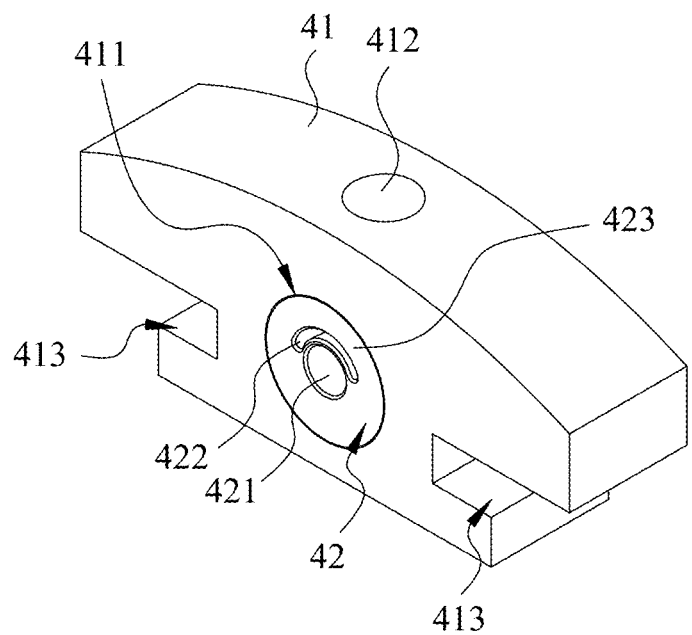
FIG. 5A is a perspective view of the second longitudinal wrapping structure of the present invention.
Figure 5B:
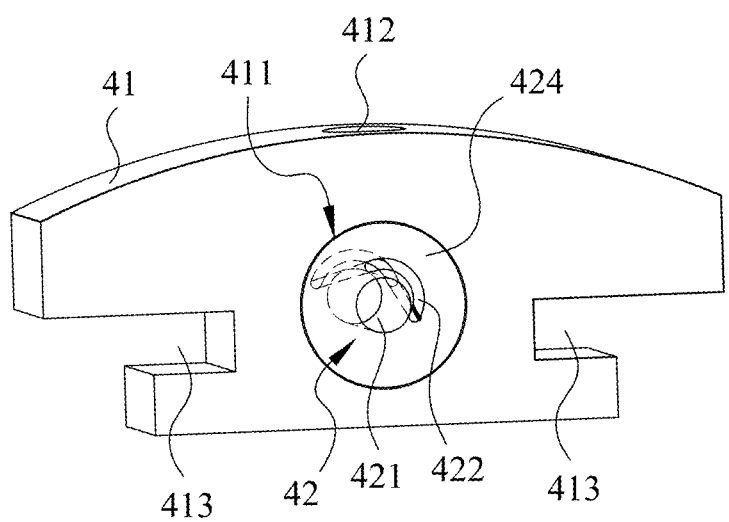
FIG. 5B is a schematic view from another angle of the second longitudinal wrapping structure of the present invention.
Figure 5C:
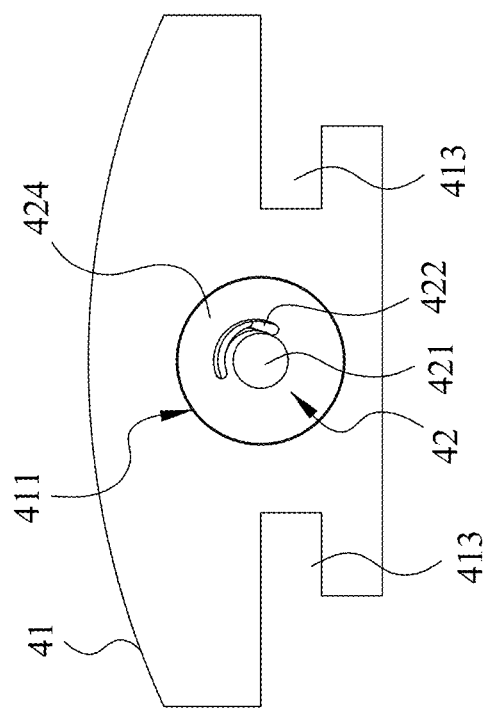
FIG. 5C is a rear view of the second longitudinal wrapping structure of the present invention.
Figure 6:
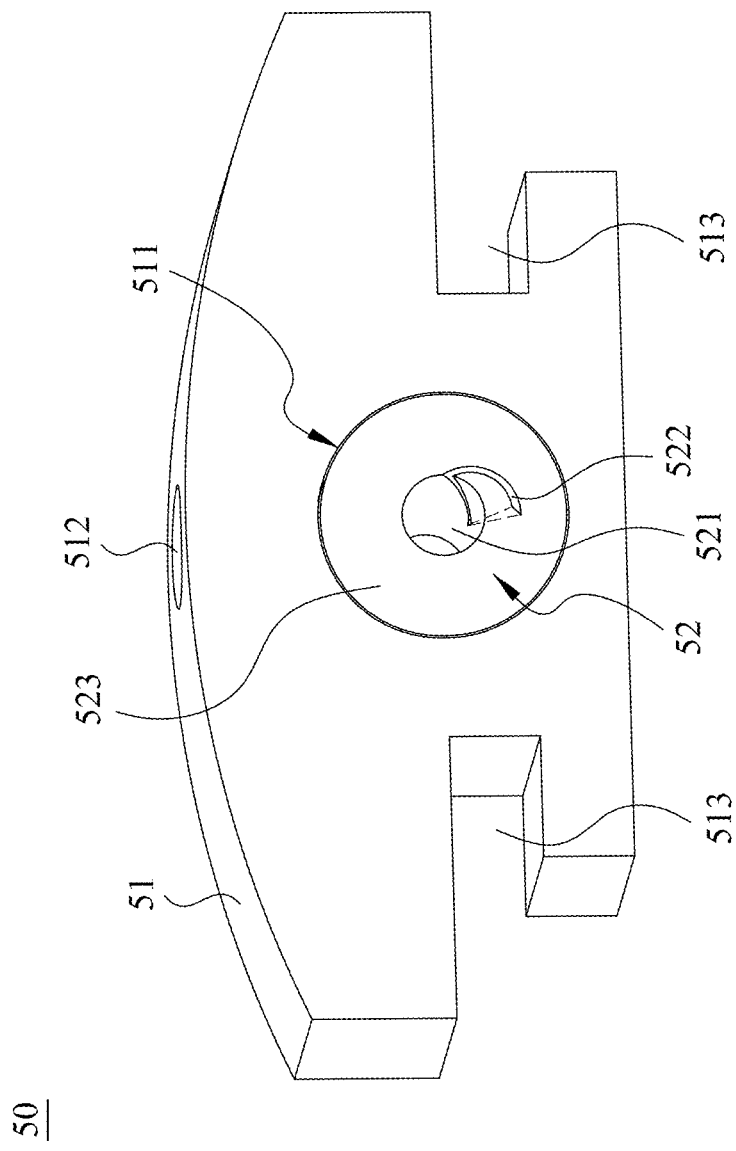
FIG. 6 is a perspective view of the second pressing structure of the present invention.
Figure 7A:
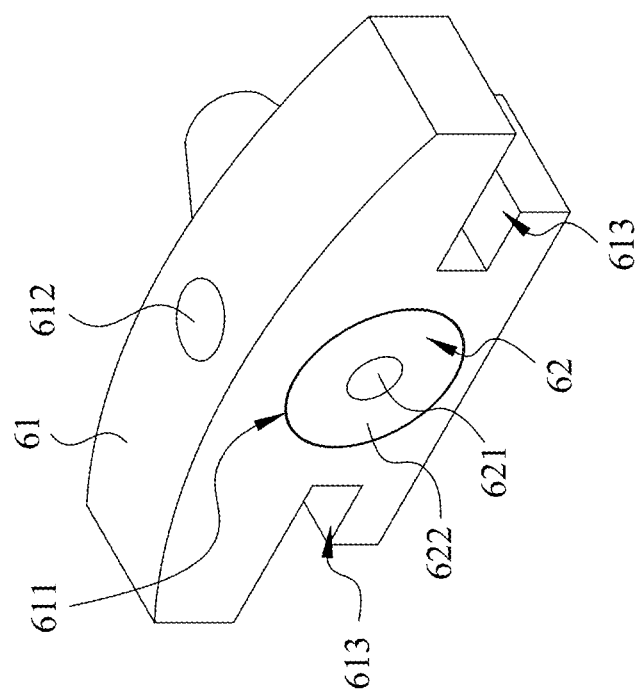
FIG. 7A is a perspective view of the first necking structure of the present invention.
Figure 7B:
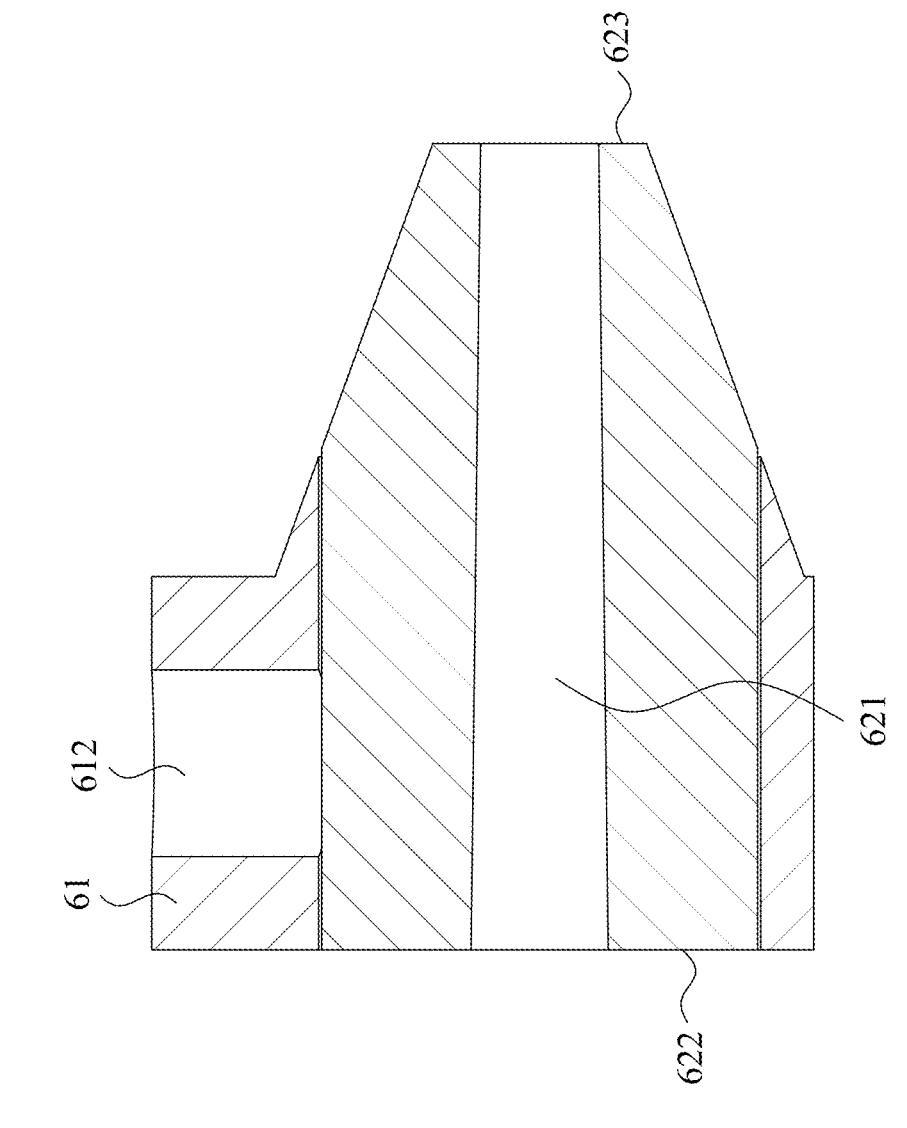
FIG. 7B is a cross-sectional view of the first necking structure of the present invention.

FIGS. 1 and 2 are respectively a perspective view and an exploded view of the first embodiment of the double-layer longitudinal wrapping mold of the present invention; FIGS. 3A-3C are respectively a perspective view, another perspective view from a different angle, and a rear view of the first longitudinal wrapping structure 20 of the present invention; FIGS. 4A-4B are a perspective view and a cross-sectional view of the first pressing structure 30 of the present invention; FIGS. 5A-5C are respectively a perspective view, another perspective view from a different angle, and a rear view of the second longitudinal wrapping structure 40 of the present invention; FIG. 6 is a perspective view of the second pressing structure 50 of the present invention; FIGS. 7A-7B are respectively a perspective view and a cross-sectional view of the first necking structure 60 of the present invention. The present invention provides a double-layer longitudinal wrapping mold, which includes a base 10, a first longitudinal wrapping structure 20, a first pressing structure 30, a second longitudinal wrapping structure 40, a second pressing structure 50, and a first necking structure 60.

As shown in FIGS. 1 and 2, the base 10 has an inlet end 11 and an outlet end 12.

As shown in FIGS. 1 to 3C, the first longitudinal wrapping structure 20 is disposed on the base 10, close to the inlet end 11 of the base 10, and is disposed with a first guide hole 221, a first outer layer wrapping tape hole 222, and an inner layer wrapping tape with a hole 223. The first guide hole 221 penetrates through both ends of the first longitudinal wrapping structure 20, the first outer wrapping tape hole 222 penetrates through both ends of the first longitudinal wrapping structure 20 and is located on one side of the first guide hole 221, and the inner wrapping tape hole 223 penetrates through both ends of the first longitudinal wrapping structure 20, is located at the other side of the first guide hole 221, and is wound sideways.

As shown in FIGS. 1, 2, 4A, and 4B, the first pressing structure 30 is disposed on the base 10, located between the first longitudinal wrapping structure 20 and the outlet end 12 of the base 10, and is disposed with a first pressing hole 321 and a second outer layer wrapping tape hole 322. The first pressing hole 321 penetrates through both ends of the first pressing structure 30 and has a diameter smaller than that of the first guide hole 221. The second outer layer wrapping tape hole 322 penetrates both ends of the first pressing structure 30 and is located at one side of the first pressing hole 321.

As shown in FIGS. 1, 2 and 5A-C, the second longitudinal wrapping structure 40 is disposed on the base 10, between the first pressing structure 30 and the outlet end 12 of the base 10, and is disposed with a second guide hole 421 and a third outer layer wrapping tape hole 422. The second guide hole 421 penetrates through both ends of the second longitudinal wrapping structure 40 and has a diameter equal to the diameter of the first guide hole 221. The third outer layer wrapping tape hole 422 penetrates through both ends of the second longitudinal wrapping structure 40, is located at one side of the second guide hole 421, and is wound sideway.

As shown in FIGS. 1, 2 and 6, the second pressing structure 50 is disposed on the base 10, between the second longitudinal wrapping structure 40 and the outlet end 12 of the base 10, and is disposed with a second pressing hole 521 and a fourth outer layer wrapping tape hole 522. The second pressing hole 521 penetrates through both ends of the second pressing structure 50 and has a diameter equal to the diameter of the first guide hole 221. The fourth outer layer wrapping tape hole 522 penetrates a front end of the second pressing structure 50, is located on the other side of the second pressing hole 521, and is wound sideway, with one side penetrating an inner wall of the second pressing hole 521.

As shown in FIGS. 1, 2, 7A, and 7B, the first necking structure 60 is disposed on the base 10, close to the outlet end 12 of the base 10, and is disposed with a necking hole 621. The necking hole 621 penetrates through both ends of the first necking structure 60 and has a diameter tapered from its inlet end to its outlet end. The diameter of the inlet end of the necking hole 621 is equal to the diameter of the first guide hole 221.

Figure 8:
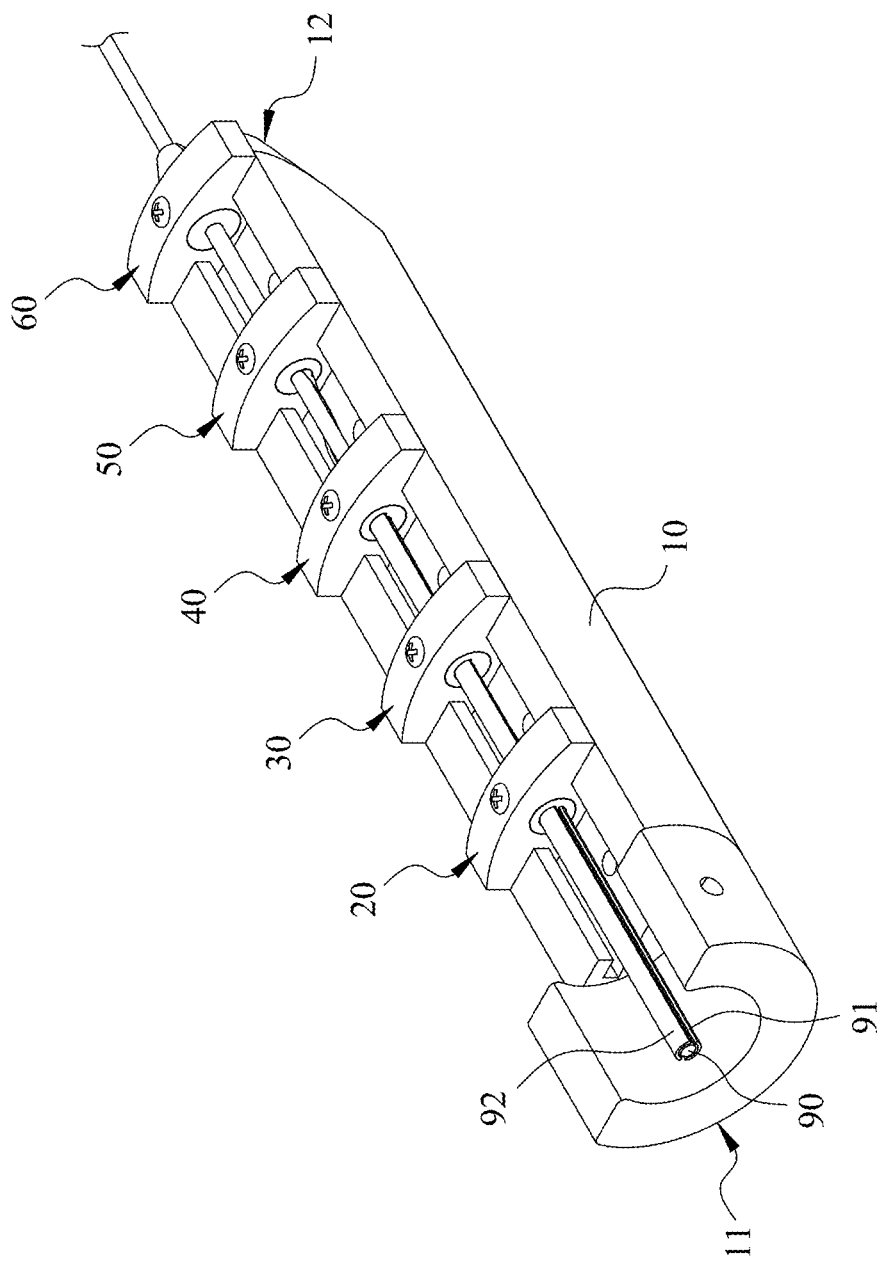
FIG. 8 is a schematic view of the double-layer longitudinal wrapping method, applicable to the first embodiment of the double-layer longitudinal wrapping mold of the present invention.
Figure 9A:
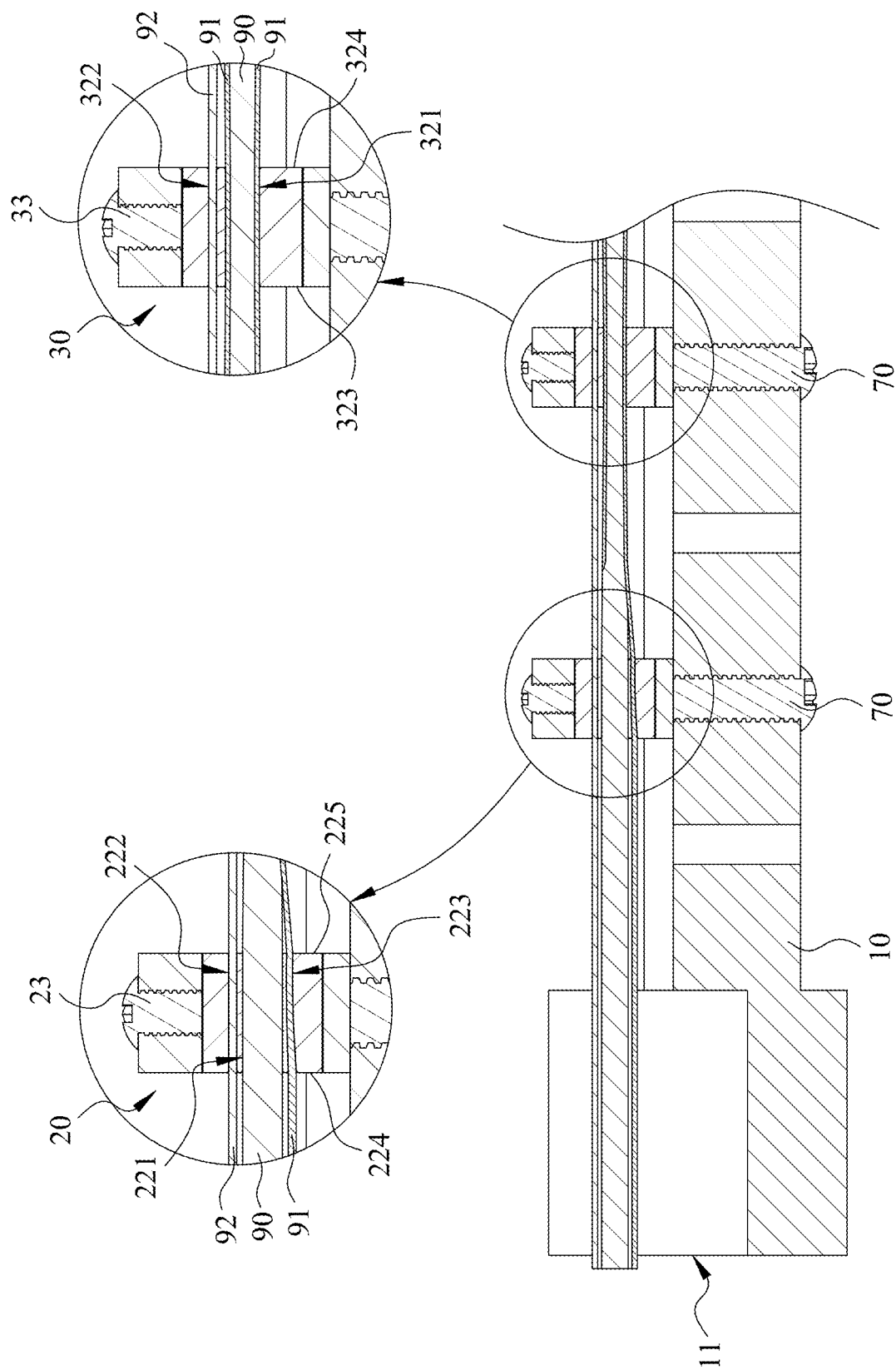
FIGS. 9A-9C are schematic views of the first longitudinal wrapping step and the first pressing step of the double-layer longitudinal wrapping method, applicable to the first embodiment of the double-layer longitudinal wrapping mold of the present invention.
Figure 9B:
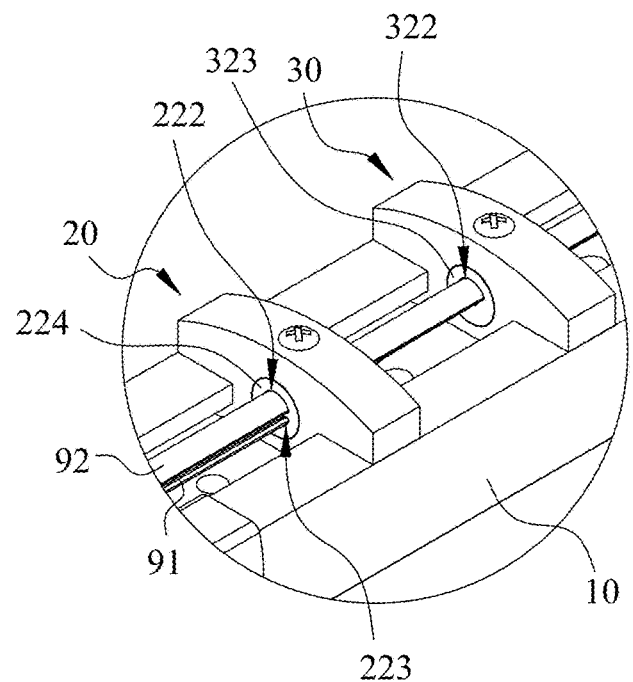
Figure 9C:
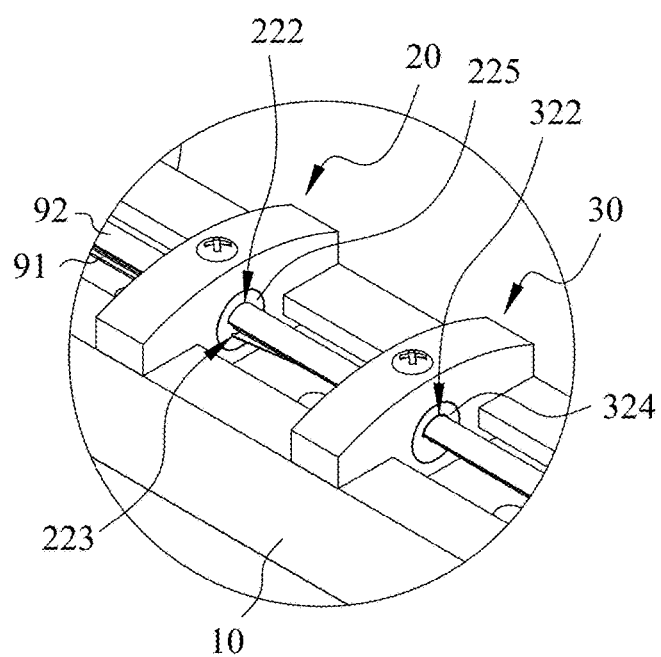
Figure 10A:
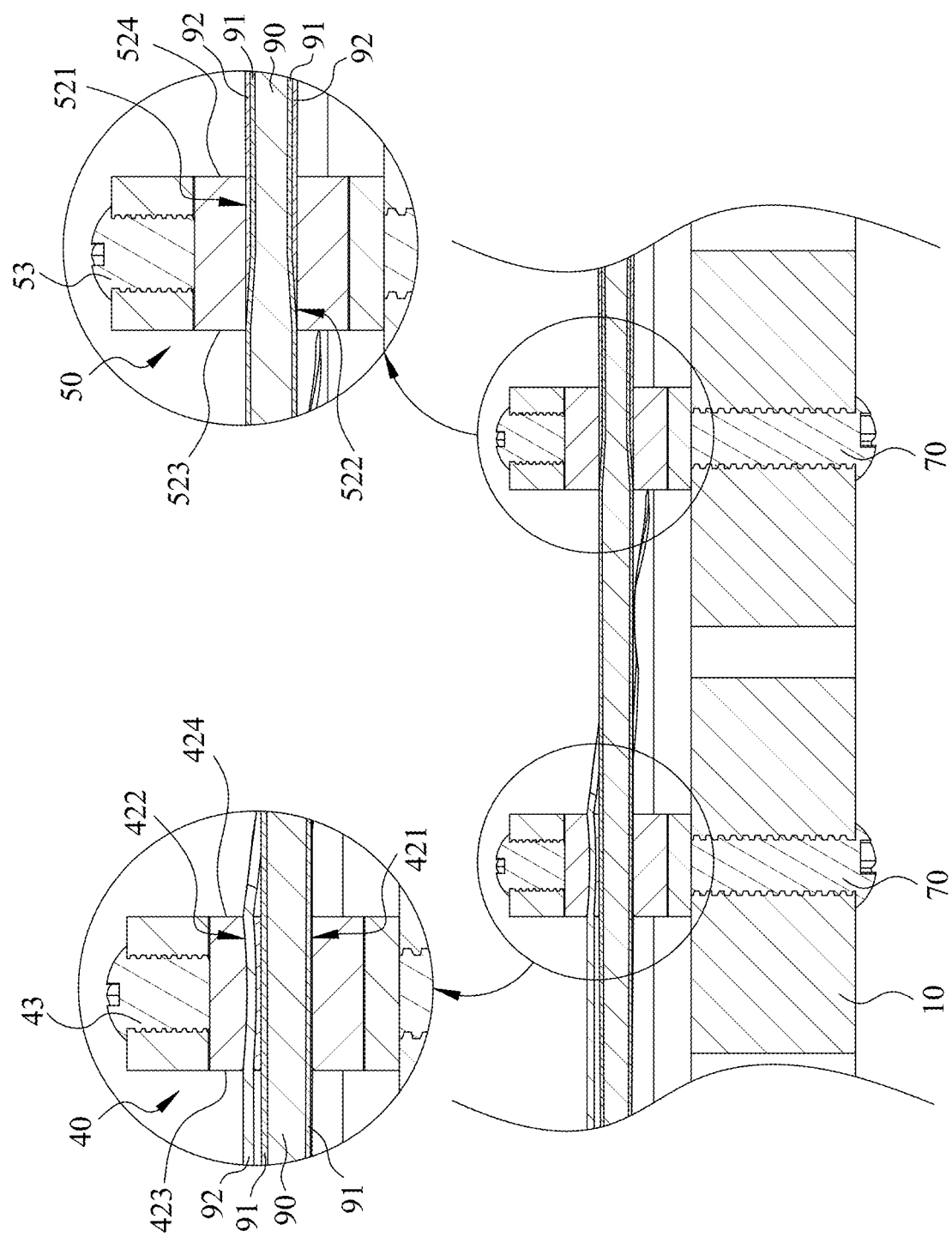
FIGS. 10A-10C are schematic views of the second longitudinal wrapping step and the second pressing step of the double-layer longitudinal wrapping method, applicable to the first embodiment of the double-layer longitudinal wrapping mold of the present invention.
Figure 10B:
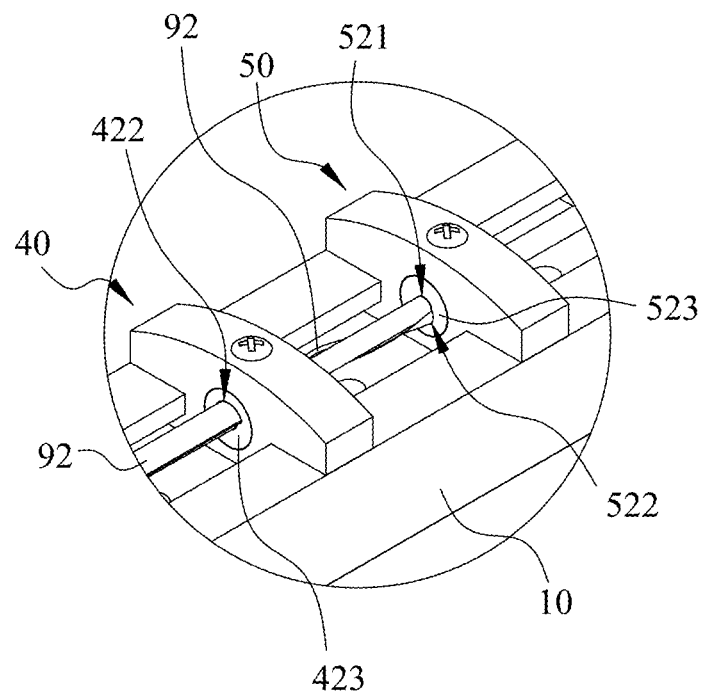
Figure 10C:
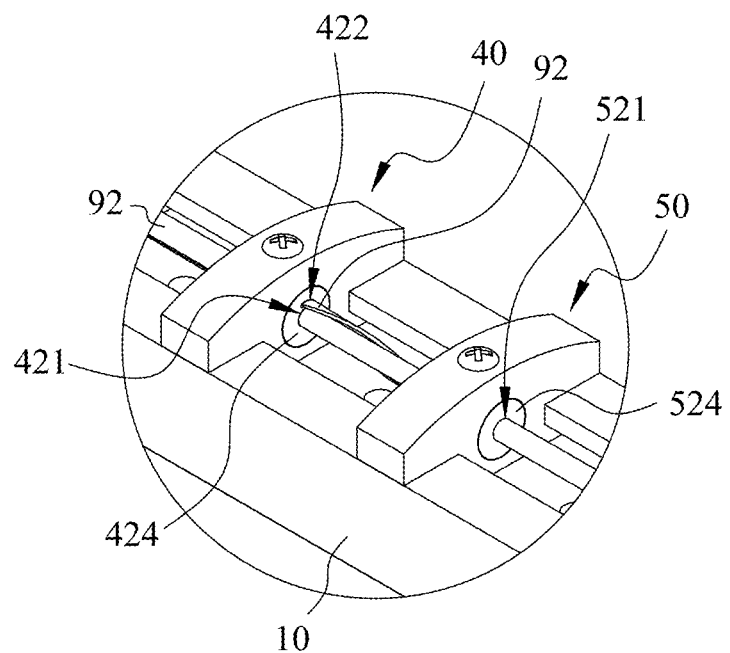
Figure 11A:
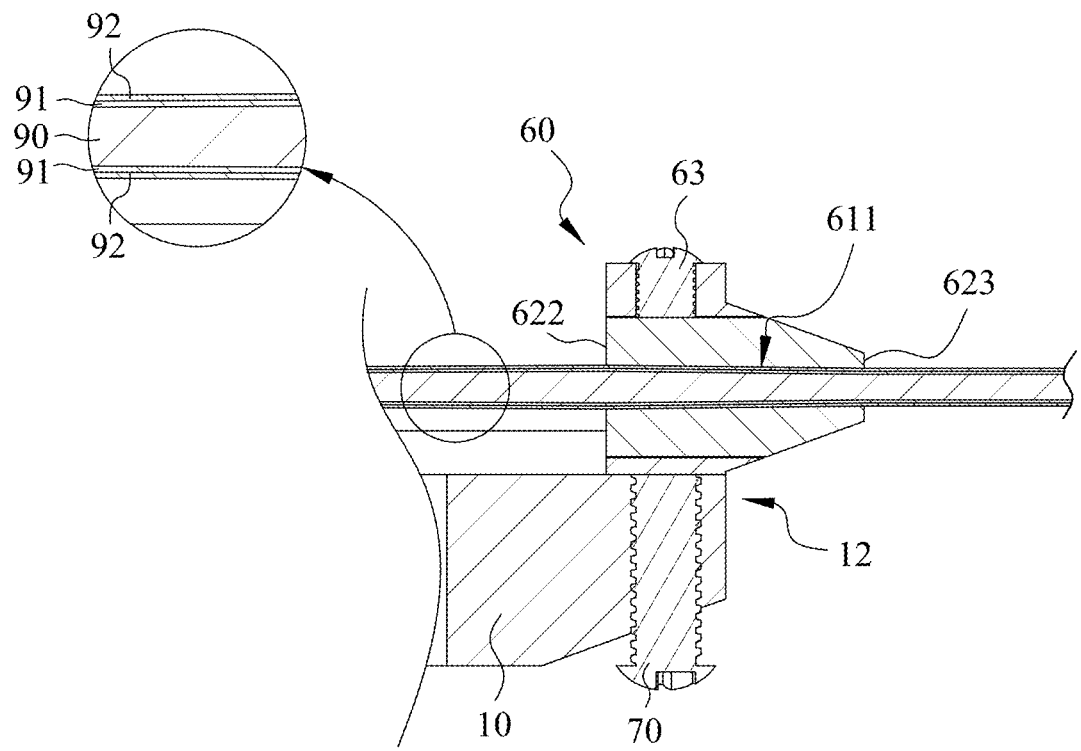
FIGS. 11A-11B are schematic views of the necking step of the double-layer longitudinal wrapping method, applicable to the first embodiment of the double-layer longitudinal wrapping mold of the present invention.
Figure 11B:
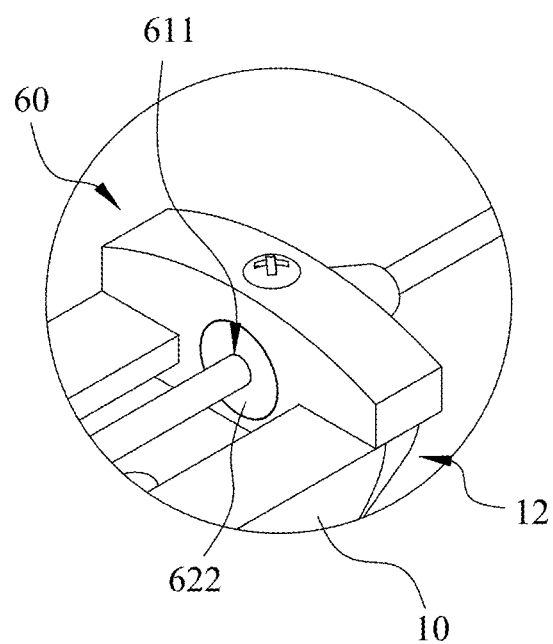

FIG. 8 is a perspective view of the double-layer longitudinal wrapping method. FIGS. 9A-9C are schematic views of the first longitudinal wrapping step and the first pressing step of the double-layer longitudinal wrapping method, applicable to the first embodiment of the double-layer longitudinal wrapping mold of the present invention. FIGS. 10A-10C are schematic views of the second longitudinal wrapping step and the second pressing step of the double-layer longitudinal wrapping method, applicable to the first embodiment of the double-layer longitudinal wrapping mold of the present invention. FIGS. 11A-11B are schematic views of the necking step of the double-layer longitudinal wrapping method, applicable to the first embodiment of the double-layer longitudinal wrapping mold of the present invention. The following will explain how to apply the first embodiment of the double-layer longitudinal wrapping mold of the present invention to implement the double-layer longitudinal wrapping method in conjunction with the drawings. The double-layer longitudinal wrapping method includes a first longitudinal wrapping step, a first pressing step, a second longitudinal wrapping step, a second pressing step, and a necking step.

In the first longitudinal wrapping step, as shown in FIGS. 8 to 9C, a conductor 90 enters from the inlet end 11 of the base 10 and extends through the first guide hole 221; a first wrapping tape 9 enters from the inlet end 11 of the base 10 and extends through the inner layer wrapping tape hole 223; and, a second wrapping 92 enters from the inlet end 11 of the base 10 and extends through the first outer layer wrapping hole 222. During the first wrapping tape 91 extending through the inner layer wrapping tape hole 223, the first wrapping tape 91 will be wound sideway along the contour of the inner layer wrapping tape hole 223. After the conductor 90 leaves the outlet end of the first guide hole 221 and the first wrapping tape 91 leaves the outlet end of the inner layer wrapping tape hole 223, the first wrapping tape 91 is wound along the outer surface of the conductor 90 so that the first wrapping tape 91 covers the entire outer surface of the conductor 90. At this point, the combination of the conductor 90 and the first wrapping tape 91 is not very tight and presents a loose state, so the diameter of the combination of the conductor 90 and the first wrapping tape 91 is greater than a target value and equal to the diameter of the first guide hole 221.

In the first pressing step, as shown in FIGS. 8 to 9C, the combination of the conductor 90 and the first wrapping tape 91 extends through the first pressing hole 321, and the second wrapping tape 92 extends through the second outer layer wrapping tape hole 322. Because the diameter of the first pressing hole 321 is smaller than the diameter of the first guide hole 221, when the combination of the conductor 90 and the first wrapping tape 91 extends through the first pressing hole 321, one of the inner walls of the first pressing holes 321 will compress the combination of the conductor 90 and the first wrapping tape 91, so that the combination of the conductor 90 and the first wrapping tape 91 presents a compact state, so the diameter of the combination of the conductor 90 and the first wrapping tape 91 is equal to the target value.

In the second longitudinal wrapping step, as shown in FIGS. 8 and 10A-10C, the combination of the conductor 90 and the first wrapping tape 91 extends through the second guide hole 421, and the second wrapping tape 92 extends through the third outer layer wrapping tape holes 422. When the second wrapping tape 2 extends through the third outer layer wrapping tape hole 422, the second wrapping tape 92 will spiral sideway along the contour of the third outer wrapping tape hole 422. After the combination of the conductor 90 and the first wrapping tape 91 leaves the outlet end of the second guide hole 421 and the second wrapping tape 92 leaves the outlet end of the third outer layer wrapping tape hole 422, the second wrapping tape 92 starts to spiral around the outer surface of the first wrapping tape 91, but the second wrapping tape 92 has yet covered on the outer surface of the first wrapping tape 91.

In the second pressing step, as shown in FIGS. 8 and 10A-10C, the combination of the conductor 90 and the first wrapping tape 91 extends through the second pressing hole 521, and the second wrapping tape 92 extends through the fourth outer layer wrapping tape hole 522. In the process of extending the second wrapping tape 92 through the fourth outer layer wrapping tape hole 522, the second wrapping tape 92 will wind sideway and spirally along the contour of the fourth outer layer wrapping tape hole 522; then, the second wrapping tape 92 passes through the inner wall of the second pressing hole 521 to enter the inside of the second pressing hole 521 and continues to spiral along the outer surface of the first wrapping tape 91. After the second wrapping tape 92 leaves the outlet end of the fourth outer layer wrapping tape hole 522, the entire second wrapping tape 92 enters the inside of the second pressing hole 521 and is wound along the outer surface of the first wrapping tape 91, so that the second wrapping tape 92 covers the outer surface of the first wrapping tape 91. At this point, the combination of the conductor 90, the first wrapping tape 91, and the second wrapping tape 92 is not tight and showing a loose state, so the diameter of the combination of the conductor 90, the first wrapping tape 91, and the second wrapping tape 92 is larger than the target value. Finally, the inner wall of the second pressing hole 521 will compress the combination of the conductor 90, the first wrapping tape 91, and the second wrapping tape 92, so that the combination of the conductor 90, the first wrapping tape 91, and the second wrapping tape 92 appears in a compact state, and the diameter of the combination of the conductor 90, the first wrapping tape 91, and the second wrapping tape 92 is equal to the target value.

In the necking step, as shown in FIGS. 8, 11A and 11B, the combination of the conductor 90, the first wrapping tape 91, and the second wrapping tape 92 extends through the necking hole 621. In the process that the combination of the conductor 90, the first wrapping tape 91, and the second wrapping tape 92 extends through the necking hole 621, an inner wall of the necking hole 621 gradually compress, through the tapered diameter, the combination of the conductor 90, the first wrapping tape 91, and the second wrapping tape 92 to tighten the combination of the conductor 90, the first wrapping tape 91, and the second wrapping tape 92, so that the combined diameter of the conductor 90, the first wrapping tape 91, and the second wrapping tape 92 is smaller than the target value after passing through the outlet end of the necking hole 621. Since the first wrapping tape 91 and the second wrapping tape 92 can be made of an elastic insulating material, such as PTFE, after combination of the conductor 90, the first wrapping tape 91, and the second wrapping tape 91 leaves the outlet end of the necking hole 621, the compressed combination of the conductor 90, the first wrapping tape 91, and the second wrapping tape 92 will recover their shape due to their elasticity, and the conductor 90, so that the combined diameter of the conductor 90, the first wrapping tape 91, and the second wrapping tape 92 is exactly equal to the target value. Finally, the combination of the conductor 90, the first wrapping tape 91, and the second wrapping tape 92 exits from the outlet end 12 of the base 10.

As shown in FIGS. 1 and 2, in the first embodiment, the first longitudinal wrapping structure 20, the first pressing structure 30, the second longitudinal wrapping structure 40, the second pressing structure 50 and the first necking structure 60 are slidably disposed on the base 10, respectively. Thereby, the first longitudinal wrapping structure 20, the first pressing structure 30, the second longitudinal wrapping structure 40, the second pressing structure 50, and the first necking structure 60 can adjust their relative positions and spacing to ensure that the concentricity of the conductors 90, the first wrapping tape 91, and the second wrapping tape 92.

More specifically, as shown in FIGS. 1 to 3C, the base 10 has a sliding groove 13, and the first longitudinal wrapping structure 20 includes a sliding block 21, a guide portion 22 and a first fastener 23. The sliding block 21 is slidably disposed on the sliding groove 13 and defines a through hole 211 and a first fixing hole 212. The guide portion 22 is disposed in the through hole 211, and the first fastener 23 penetrates through the first fixing hole 212 and fastens the guide portion 22 to the sliding block 21. The guide portion 22 is disposed with the first guide hole 221, the first outer layer wrapping tape hole 222, and the inner layer wrapping tape hole 223; in other words, the first guide hole 221, the first outer layer wrapping tape hole 222, and the inner layer wrapping tape hole 223 penetrate a front end 224 and a rear end 225 of the guide portion 22, the inlet end of the first guide hole 221, the inlet end of the first outer layer wrapping tape hole 222, and the inlet end of the inner layer wrapping tape hole 223 are located at the front end 224 of the guide portion 22; the outlet end of the first guide hole 221, the outlet end of the first outer layer wrapping tape hole 222, and the outlet end of the inner layer wrapping tape hole 223 are located at the rear end 225 of the guide portion 22. As shown in FIGS. 1, 2, 4A and 4B, the first pressing structure 30 includes a sliding block 31, a guide portion 32 and a first fastener 33. The sliding block 31 is slidably disposed on the sliding groove 13 and is disposed with a through hole 311 and a first fixing hole 312. The guide portion 32 is disposed in the through hole 311, and the first fastener 33 penetrates through the first fixing hole 312 and fastens the guide portion 32 to the sliding block 31. The guide portion 32 is disposed with a first pressing hole 321 and a second outer layer wrapping tape hole 322; in other words, the first pressing hole 321 and the second outer layer wrapping tape hole 322 penetrate a front end 323 and a rear end 324 of the guide portion 32, the inlet end of the first pressing hole 321 and the inlet end of the second outer layer wrapping tape hole 322 are located at the front end 323 of the guide portion 32, and the outlet end of the first pressing hole 321 and the outlet end of the second outer layer wrapping tape hole 322 are located at the rear end 324 of the guide portion 32. As shown in FIGS. 1, 2, and 5A-5C, the second longitudinal wrapping structure 40 includes a sliding block 41, a guide portion 42 and a first fastener 43. The sliding block 41 is slidably disposed on the sliding groove 13 and is disposed with a through hole 411 and a first fixing hole 412. The guide portion 42 is disposed in the through hole 411, and the first fastener 43 penetrates through the first fixing hole 412 and fastens the guide portion 42 to the sliding block 41. The guide portion 42 is disposed with a second guide hole 421 and a third outer layer wrapping tape hole 422; in other words, the second guide hole 421 and the third outer layer wrapping tape hole 422 penetrate a front end 423 and a rear end 424 of the guide portion 42, and the inlet end of the second guide hole 421 and the inlet end of the third outer layer wrapping tape hole 422 are located at the front end 423 of the guide portion 42, and the outlet end of the second guide hole 421 and the outlet end of the third outer layer wrapping tape hole 422 are located at the rear end of the guide portion 42 424. As shown in FIGS. 1, 2 and 6, the second pressing structure 50 includes a sliding block 51, a guide portion 52, and a first fastener 53. The sliding block 51 is slidably disposed on the sliding groove 13 and is disposed with a through hole 511 and a first fixing hole 512. The guide portion 52 is disposed in the through hole 511, and the first fastener 53 penetrates through the first fixing hole 512 and fastens the guide portion 52 to the sliding block 51. The guide portion 52 is disposed with a second pressing hole 521 and a fourth outer layer wrapping tape hole 522; in other words, the second pressing hole 521 penetrates a front end 523 and a rear end 524 of the guide portion 52 (see FIGS. 10A and 10C). The inlet end of the second pressing hole 521 is located at the front end 523 of the guide portion 52, and the outlet end of the second pressing hole 521 is located at the rear end 524 of the guide portion 52. The inlet end of the fourth outer layer wrapping tape hole 522 is located at the front end 523 of the guide portion 52, and the outlet end of the fourth outer layer wrapping tape hole 522 is located inside the guide portion 52. As shown in FIGS. 1, 2, 7A and 7B, the first necking structure 60 includes a sliding block 61, a guide portion 62 and a first fastener 63. The sliding block 61 is slidably disposed on the sliding groove 13 and is disposed with a through hole 611 and a first fixing hole 612. The guide portion 62 is disposed in the through hole 611, and the first fastener 63 penetrates the first fixing hole 612 and fastens the guide portion 62 to the sliding block 61. The guide portion 62 is disposed with a necking hole 621; in other words, the necking hole 621 penetrates a front end 622 and a rear end 623 of the guide portion 62, the inlet end of the necking hole 621 is located at the front end 622 of the guide portion 62, and the outlet end of the necking hole 621 is located at the rear end 623 of the guide portion 62. Thereby, the sliding blocks 21, 31, 41, 51, 61 can all slide on the sliding groove 13 to adjust the relative position and spacing of the sliding blocks 21, 31, 41, 51, 61, and at the same time, the guide portions 22, 32, 42, 52, 62 can move in the through holes 211, 311, 411, 511, 611 and are fixed by the first fasteners 23, 33, 43, 53, 63 to adjust the relative positions and gaps of the guide portions 22, 32, 42, 52, 62, so as to further ensure the concentricity of the conductor 90, the first wrapping tape 91, and the second wrapping tape 92.

Preferably, as shown in FIGS. 1 and 2, the base 10 is disposed with a plurality of second fixing holes 14, and a plurality of second fasteners 70 are respectively inserted into the second fixing holes 14 and respectively fasten the sliding blocks 21, 31, 41, 51, and 61 to the sliding groove 13. More specifically, as shown in FIGS. 9A, 10 A, and 11 A, after the relative positions and spacings of the sliding blocks 21, 31, 41, 51, and 61 are adjusted to be in place, the second fasteners 70 will press against the bottom of the sliding blocks 21, 31, 41, 51, 61, so that the sliding blocks 21, 31, 41, 51, 61 are fixed in the sliding groove 13.

Preferably, as shown in FIGS. 1 and 2, a sliding rail 15 is protruded on both sides of the base 10 respectively, and a guide groove 213, 313, 413, 513, and 613 is protruded on both sides of each sliding block 21, 31, 41, 51, and 61, respectively. The guide grooves 213, 313, 413, 513, and 613 are slidably disposed on the two slide rails 15 respectively. Thereby, the sliding blocks 21, 31, 41, 51, 61 can slide stably on the sliding groove 13 along the two slide rails 15, and the second fasteners 70 together with the two slide rails 15 can fasten the sliding blocks 21, 31, 41, 51, 61 at specific positions, and the sliding blocks 21, 31, 41, 51, 61 can also be separated from the sliding groove 13 from both ends of the two slide rails 15, which facilitates assembly and disassembly.

As shown in FIGS. 3A to 3C, in the first embodiment, the sideway winding of the inner layer wrapping tape hole 223 is defined as follows: the inner layer wrapping tape hole 223 gradually approaching the first guide hole 221 from its inlet end to its outlet end, one side of the inner layer wrapping tape hole 223 penetrates an inner wall of the first guide hole 221, and an arc length of the inner layer wrapping tape hole 223 gradually decreases. As shown in FIGS. 8 to 9C, during the process of extending the first wrapping tape 91 through the inner layer wrapping tape hole 223, the first wrapping tape 91 will be wound sideway along the contour of the inner wrapping tape hole 223, so that the first wrapping tape 91 gradually approaches the first guide hole 221 from the inlet end of the inner layer wrapping tape hole 223 to the outlet end of the inner layer wrapping tape hole 223; then, the first wrapping tape 91 enters the inside of the first guide hole 221 through the inner wall of the first guide hole 221 and starts to spiral along the outer surface of the conductor 90. As shown in FIGS. 8 to 9C, after the conductor 90 leaves the outlet end of the first guide hole 221 and the first wrapping tape 91 leaves the outlet end of the inner layer wrapping tape hole 223, the first wrapping tape 91 continues to wind along the outer surface of the conductor 90, so that the first wrapping tape 91 covers the entire outer surface of the conductor 90.

As shown in FIGS. 5A-5C, in the first embodiment, the sideway winding of the third outer layer wrapping tape hole 422 is defined as follows: the third outer layer wrapping tape hole 422 gradually approaching the second guide hole 421 from its inlet end to its outlet end. As shown in FIGS. 8 and 10A-10C, in the process of extending the second wrapping tape 92 through the third outer wrapping tape hole 422, the second wrapping tape 92 will be wound sideway along the contour of the third outer wrapping tape hole 422, so that the second wrapping tape 92 gradually approaches the second guide hole 421 from the inlet end of the third outer layer wrapping tape hole 422 to the outlet end of the third outer layer wrapping tape hole 422. As shown in FIGS. 8 and 10A-10C, after the conductor 90 leaves the outlet end of the second guide hole 421 and the second wrapping tape 92 leaves the outlet end of the third outer layer wrapping tape hole 422, the second wrapping tape 92 continues to wind along the outer surface of the first wrapping tape 91, but the second wrapping tape 92 has yet cover the outer surface of the first wrapping tape 91.

As shown in FIG. 6, in the first embodiment, the sideway winding of the fourth layer wrapping tape hole 522 is defined as follows: the fourth outer layer wrapping tape hole 522 gradually approaching the second pressing hole 521 from its inlet end to its outlet end, one side of the fourth outer layer wrapping tape hole 522 penetrates an inner wall of the second pressing hole 521, and an arc length of the fourth outer layer wrapping tape hole 522 gradually decreases. As shown in FIGS. 8 and 10A-10C, during the process of extending the second wrapping tape 92 through the fourth outer layer wrapping tape hole 522, the second wrapping tape 92 will be wound sideway along the contour of the fourth outer layer wrapping tape hole 522, so that the second wrapping tape 92 gradually approaches the second pressing hole 521 from the inlet end of the fourth outer layer wrapping tape hole 522 to the outlet end of the fourth outer layer wrapping tape hole 522; then, the second wrapping tape 92 enters the inside of the second pressing hole 521 through the inner wall of the second pressing hole 521 and continues to spiral along the outer surface of the first wrapping tape 91. As shown in FIGS. 8 and 10A-10C, after the second wrapping tape 92 leaves the outlet end of the fourth outer layer wrapping tape hole 522, the second wrapping tape 92 enters the inside of the second pressing hole 521 and continues to wind along the outer surface of the first wrapping tape 91, so that the second wrapping tape 92 covers the entire outer surface of the first wrapping tape 91.

As shown in FIGS. 3A to 7 B, in the first embodiment, the cross section of the first guide hole 221, the cross section of the first pressing hole 321, the cross section of the second guide hole 421, the second pressing hole 521, and the cross section of the necking hole 621 are all circular. As shown in FIGS. 8 to 11B, the shape of the first guide hole 221 is just enough to allow the conductor 90 with a circular cross section to extend through, and the shape of the first pressing hole 321 and the second guide hole 421 is just enough to allow the circular cross section of the combination of the conductor 90 and the first wrapping tape 91 to extend through, and the shape of the second pressing hole 521 and the necking hole 621 is just enough to allow the circular cross section of the combination of the conductor 90, the first wrapping tape 91, and the second wrapping tape 92 to extend through.

As shown in FIGS. 3A to 7B, in the first embodiment, the cross sections of the inner layer wrapping hole 223, the first outer layer wrapping tape hole 222, the second outer layer wrapping tape hole 322, the third outer layer wrapping tape hole 422, and the fourth outer layer wrapping tape holes 522 are all arc-shaped. As shown in FIGS. 8 to 9C, the first wrapping tape 91 can be bent into an arc to extend through the inner wrapping tape hole 223, and the arc-shaped first wrapping tape 91 can be smoothly wound sideway along the contour of the inner wrapping tape hole 223 to wind sideways. As shown in FIGS. 8 and 10A-10C, the second wrapping tape 92 can be bent into an arc to extend through the first outer layer wrapping tape hole 222, the second outer layer wrapping tape hole 322, the third outer layer wrapping tape hole 422, and the fourth outer layer wrapping tape hole 522, and the arc-shaped second wrapping tape 92 can be smoothly wound sideway along the contour of the third outer layer wrapping tape hole 422 and the contour of the fourth outer layer wrapping tape hole 522.

Preferably, as shown in FIGS. 3A, 4A, and 5A, the arc length of the first outer layer wrapping tape hole 222, the arc length of the second outer layer wrapping tape hole 322, and the arc of the third outer layer wrapping tape hole 422 all have equal length. Therefore, as shown in FIG. 8, the second wrapping tape 92 can continuously extend through the first outer layer wrapping tape hole 222, the second outer layer wrapping tape hole 322, and the third outer layer wrapping tape hole 422 in the same shape, so that before covering the outer surface of the first wrapping tape 91, the second wrapping tape 92 can maintain the shape without deformation.

As shown in FIGS. 5B and 6, in the first embodiment, the position of the outlet end of the third outer layer wrapping tape hole 422 and the position of the inlet end of the fourth outer layer wrapping tape hole 522 are opposite to each other. Specifically, the outlet end of the third outer layer wrapping tape hole 422 is located within the range from above to the side of the second guide hole 421, and the inlet end of the fourth outer layer wrapping tape hole 522 is located within the range from below to the side of the second pressing hole 521. As shown in FIGS. 8 and 10A-10C, after the combination of the conductor 90 and the first wrapping tape 91 exits from the outlet end of the second guide hole 421 and the second wrapping tape 92 exits from the outlet end of the third outer tape hole 422, the second wrapping tape 92 spirals around from one side of the first wrapping tape 91 to the other side of the first wrapping tape 91, and enters the inlet end of the fourth outer wrapping tape hole 522, so that the second wrapping tape 92 starts to spiral along the outer surface of the first wrapping tape 91, but the second wrapping tape 92 has yet covered on the outer surface of the first wrapping tape 91.

As shown in FIGS. 1, 2, 7A and 7B, in the first embodiment, the guide portion 62 protrudes from the side of the sliding block 61 facing the outlet end 12 of the base 10. More specifically, the guide portion 62 can provide a necking hole 621 with a longer length, so that a slope of the inner wall of the necking hole 621 is relatively gentle from its inlet end to its outlet end. As shown in FIGS. 8, 11A, and 11B, in the process that the combination of the conductor 90, the first wrapping tape 91 and the second wrapping tape 92 extends through the necking hole 621, the gentle slope of the inner wall of the necking hole 621 compresses the combination of the conductor 90, the first wrapping tape 91, and the second wrapping tape 92 to ensure that the combination of the conductor 90, the first wrapping tape 91, and the second wrapping tape 92 is appropriately compressed and has the ability to restore shape, preventing the combination of the conductor 90, the first wrapping tape 91, and the second wrapping tape 92 from being excessively compressed and deformed.

Figure 12:
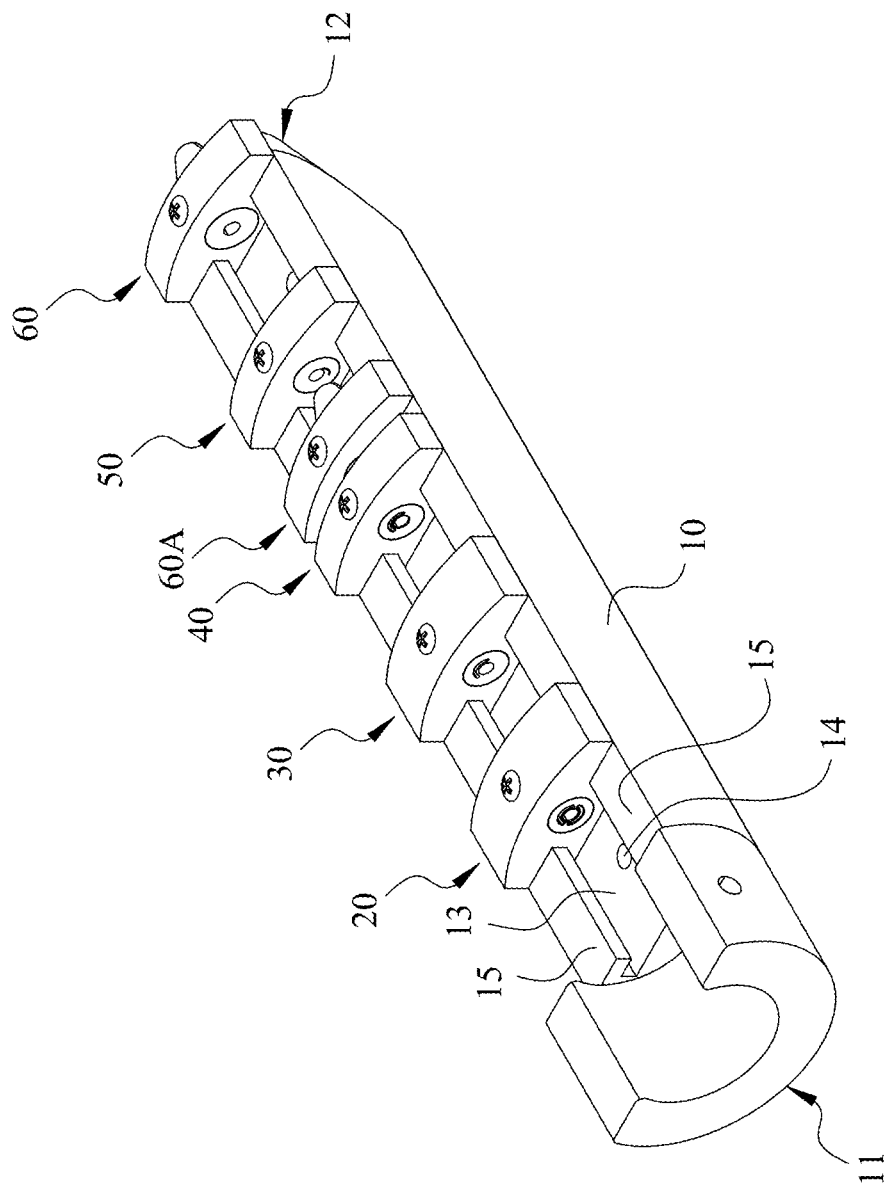
FIG. 12 is a perspective view of the second embodiment of the double-layer longitudinal wrapping mold of the present invention.

FIG. 12 is a perspective view of the second embodiment of the double-layer longitudinal wrapping mold of the present invention. As shown in FIG. 12, the difference between the second embodiment and the first embodiment is that it further includes a second necking structure 60A, which is disposed on the base 10 and located between the second longitudinal structure 40 and the second pressing structure 50. The structural features of the second necking structure 60A and the first necking structure 60 are completely the same.

Figure 13:
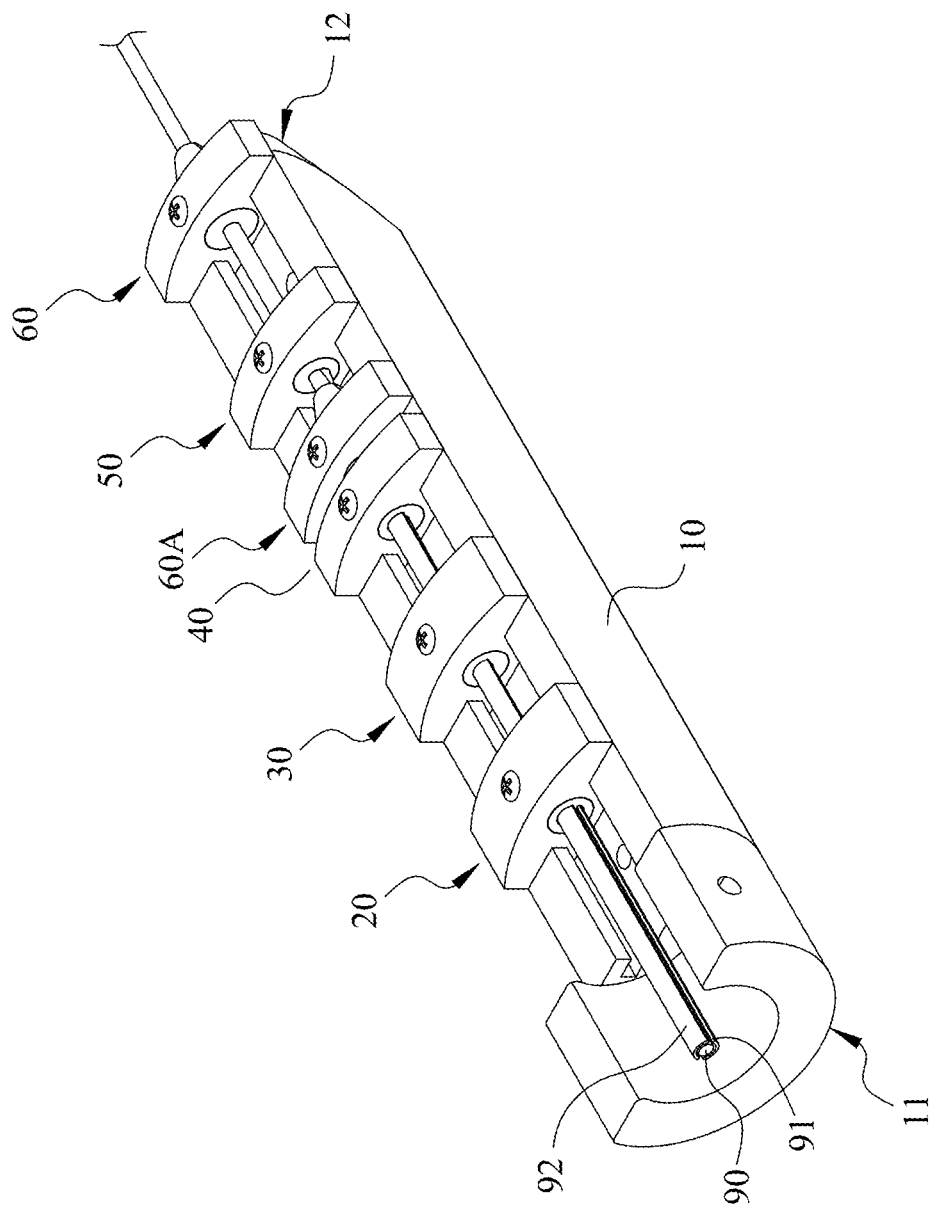
FIG. 13 is a schematic view of the double-layer longitudinal wrapping method, applicable to the second embodiment of the double-layer longitudinal wrapping mold of the present invention.

FIG. 13 shows a perspective view of the double-layer longitudinal wrapping method, which applies the second embodiment of the double-layer longitudinal wrapping mold of the present invention. As shown in FIG. 13, the double-layer longitudinal wrapping method further includes a front necking step between the second longitudinal wrapping step and the second pressing step. The combination of the conductor 90, the first wrapping tape 91, and the second wrapping tape 92 extends simultaneously through the necking hole 621 of the second necking structure 60A. In the process that the combination of the conductor 90 and the first wrapping tape 91 extends through the necked hole 621 of the second necked structure 60A, the inner wall of the necking hole 621 of the second necking structure 60A is gradually reduced with tapered diameter. The combination of the conductor 90 and the first wrapping tape 91 is compressed to make the combination of the conductor 90 and the first wrapping tape 91 tighter, so the when the combination of the conductor 90 and the first wrapping tape 91 passes through outlet end of the necking hole 621 of the second necking structure 60A, he diameter of the combination of the conductor 90 and the first wrapping tape 91 is smaller than the target value. Since the first wrapping tape 91 can be made of an insulating material with elasticity, such as PTFE, after the combination of the conductor 90 and the first wrapping tape 91 leaves the outlet of the second necking hole 621 of the second necking structure 60A, the compressed combination of the compressed conductor 90 and the first wrapping tape 91 will recover its shape due to its elasticity. The diameter of the recovered combination of the conductor 90 and the first wrapping tape 91 is exactly equal to the target value.

Figure 14:
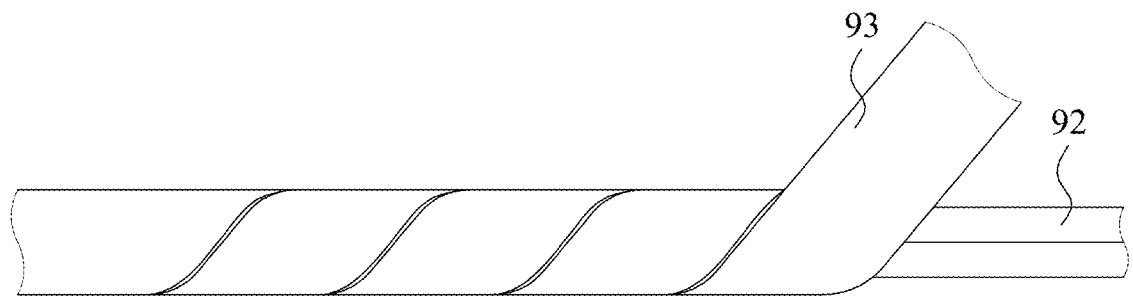
FIG. 14 is a schematic view of the first wrapping step of the double-layer wrapping method.
Figure 15:
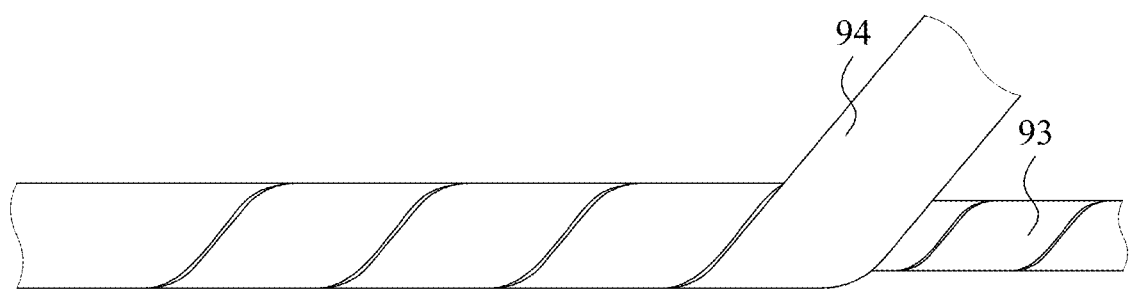
FIG. 15 is a schematic view of the second wrapping step of the double-layer wrapping method.

FIG. 14 shows a schematic view of the first wrapping step of the double-layer wrapping method, and FIG. 15 shows a schematic view of the second wrapping step of the double-layer wrapping method. The double-layer wrapping method will be described below in conjunction with the drawings. The double-layer wrapping method includes a first wrapping step and a second wrapping step.

In the first wrapping step, as shown in FIG. 14, a third wrapping tape 93 is continuously wound on the outer surface of the second wrapping tape 92 along the circumferential direction and along the length direction of the conductor 90.

In the second wrapping step, as shown in FIG. 15, a fourth wrapping tape 94 is continuously wound on the outer surface of the third wrapping tape 93 along the circumferential direction and along the length direction of the conductor 90.

Preferably, the material of the third wrapping tape 93 and the fourth wrapping tape 94 is an insulating material to provide an insulating effect, preferably PTFE.

Figure 16:
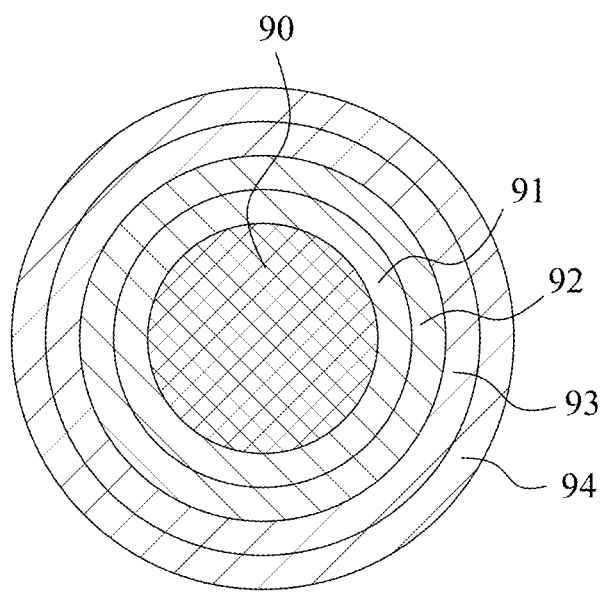
FIG. 16 is a lateral cross-sectional view of the cable of the present invention.
Figure 17:
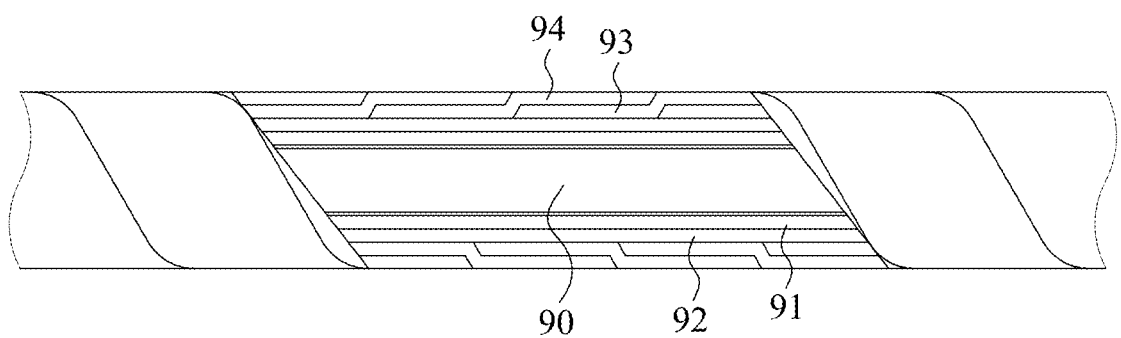
FIG. 17 is a longitudinal cross-sectional view of the cable of the present invention.

FIG. 16 is a lateral cross-sectional view of the cable 100 of the present invention, and FIG. 17 is a longitudinal cross-sectional view of the cable 100 of the present invention. After the aforementioned double-layer longitudinal wrapping method and double-layer wrapping method, the combination of the conductor 90, the first wrapping tape 91, the second wrapping tape 92, the third wrapping tape 93 and the fourth wrapping tape 94 forms a cable 100.

Figure 18:
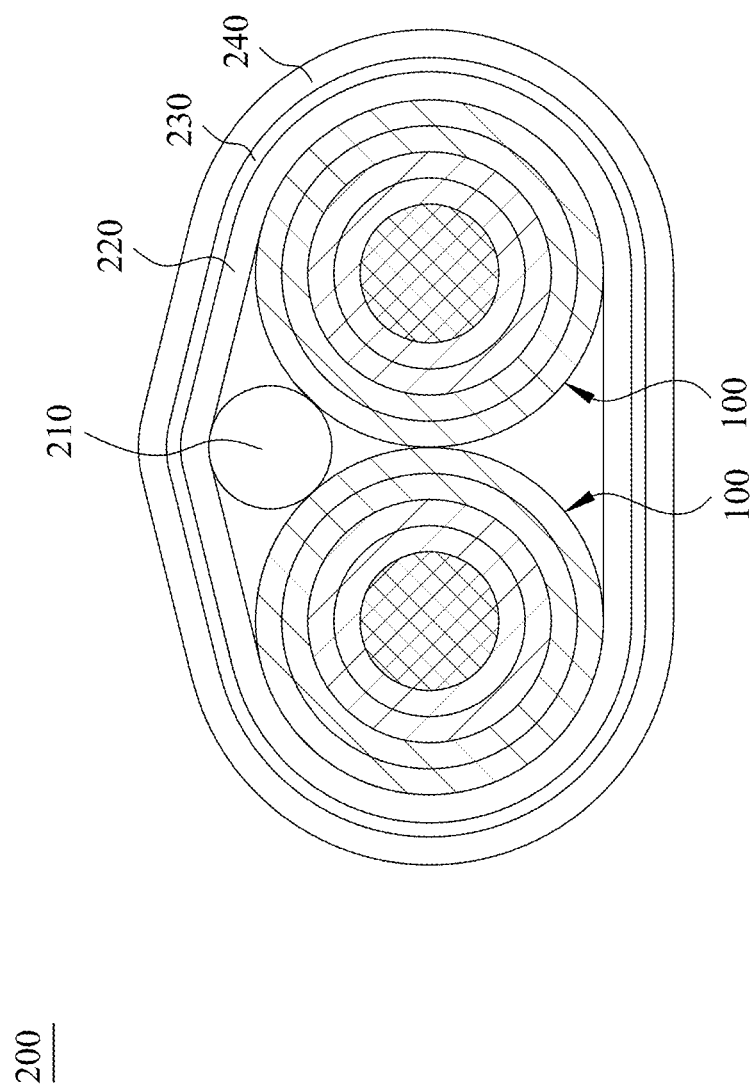
FIG. 18 is a lateral cross-sectional view of the cable module of the present invention.
Figure 19:
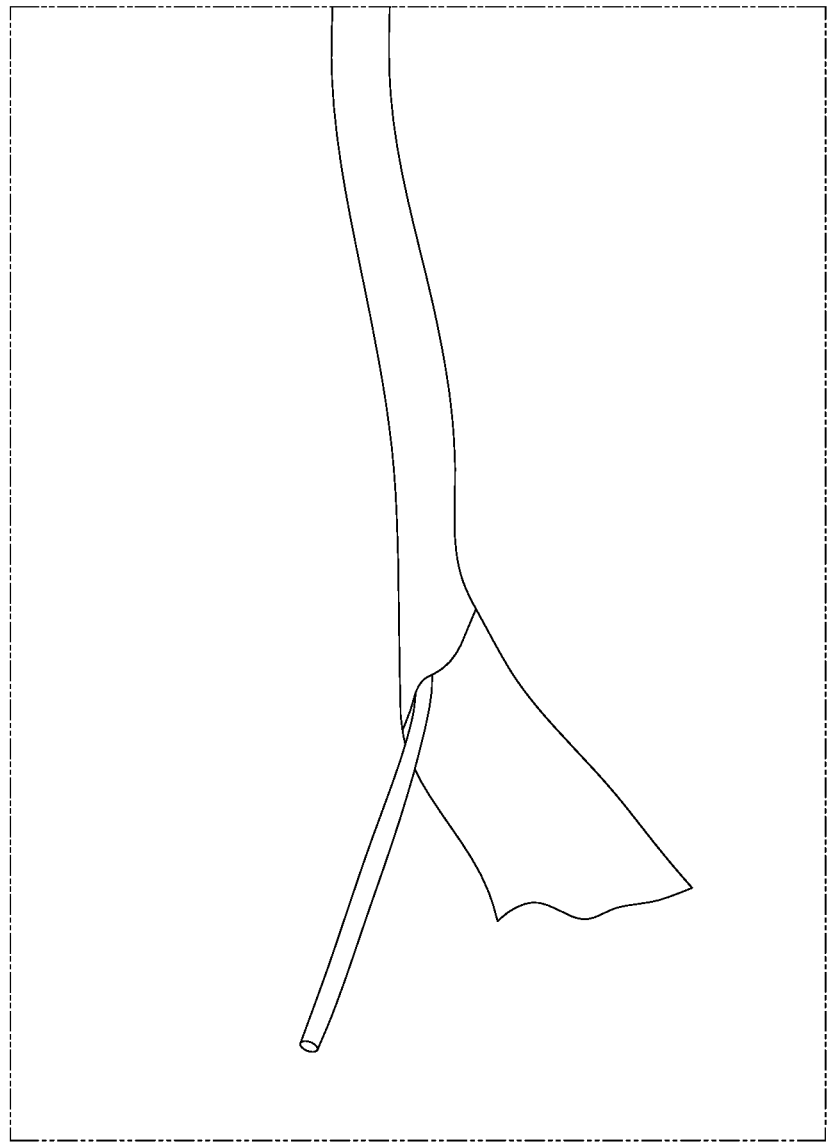
FIG. 19 is a photo of a conventional cable wrapping.
Figure 20:
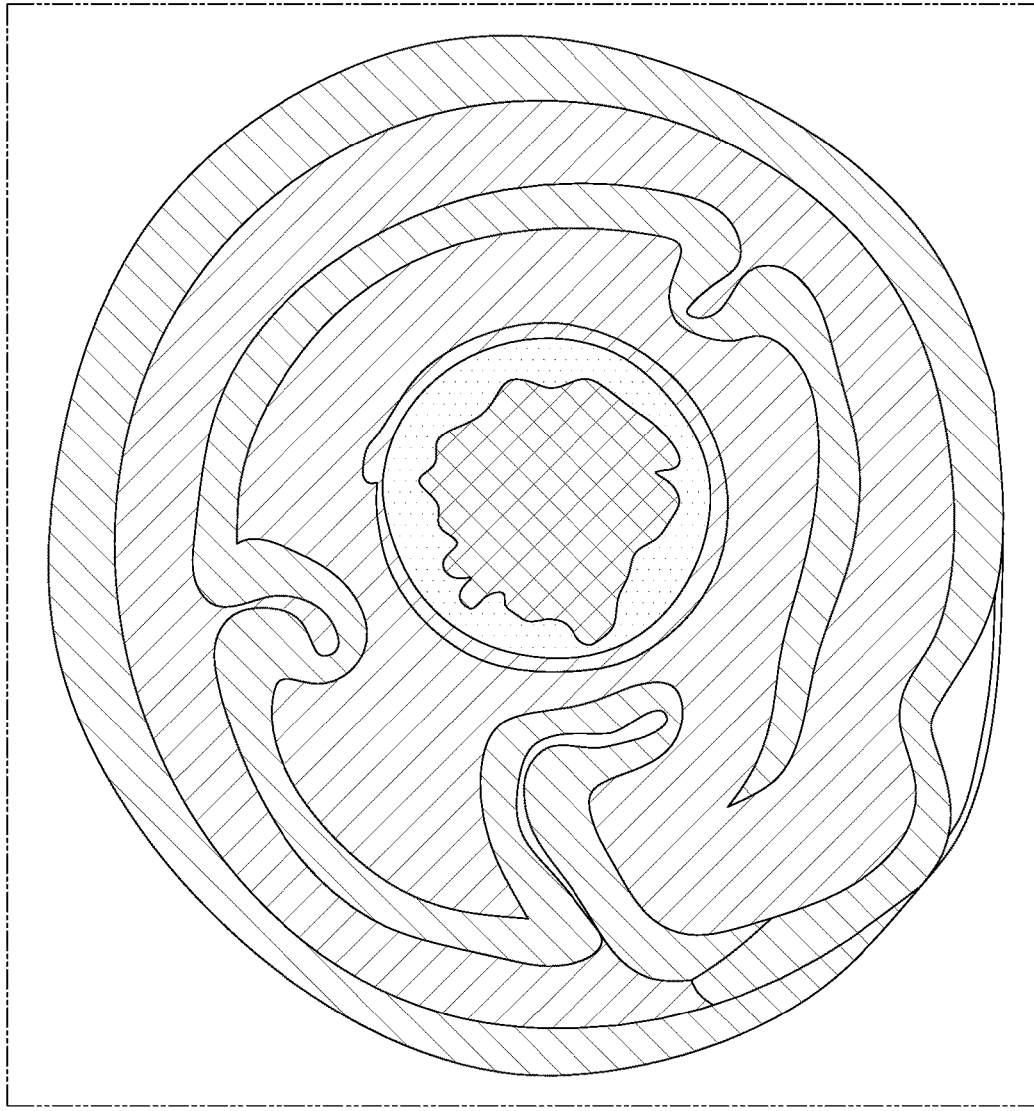
FIG. 20 is a cross-sectional photo of an actual product of a conventional cable.

FIG. 18 is a cross-sectional view of the cable module 200 of the present invention. As shown in FIG. 18, the cable module of the present invention includes two cables 100, a conductor 210, an inner membrane 220, a middle membrane 230, and an outer membrane 240. The inner sides of the two cables 100 are in contact with each other. The conductor 210 contacts the outer surfaces of the two cables 100. The inner membrane 220 wraps around one side of the two cables 100 and one side of the conductor 210 in a longitudinal manner and is combined with each other, so that the inner membrane 220 covers the two cables 100 and the conductor 210. The middle membrane 230 is continuously wound on an outer surface of the inner membrane 220 along the circumferential direction and along the length direction of the two cables 100. The outer membrane 240 is continuously wound on an outer surface of the middle membrane 230 along the circumferential direction and along the length direction of the two cables 100. Preferably, the material of the inner membrane 220 and the middle membrane 230 is aluminum foil Mylar (Al-Mylar), and the material of the outer membrane 240 is hot-melt-PET Mylar.

Various electrical characteristics and various mechanical characteristics of the cables made by the present invention and the conventional wrapping method are tested and compared. The electrical characteristic test includes differential impedance value, insertion loss (@13.28 G/Hz) and time difference (Skew), the target value of impedance value is 105±5Ω. The test of mechanical properties includes roundness, wrinkles and flexibility/bendability. The test conditions for flexibility/bendability include (1) a bending radius of 10×R and (2) a bending angle of 180°±90° and (3) the bending speed is 13 cycles/min and (4) the load is 50 g). The test results are organized in the following table:

|  | Cable made by conventional wrapping method | Cable 100 of the present invention |
| --- | --- | --- |
| Impedance | 99 ~ 119 Ω | 102 ~ 109 Ω |
| Insertion Loss | ≤−3.40 dB/m | ≤−2.70 dB/m |
| Skew | ≤16 ps/M | ≤10 ps/M |
| Flexibility/Bendability | 60 cycles | 500 cycles |
| Roundness | 80~85% | ≥93% |
| Wrinkles | Yes | No |

As seen from the above table, compared with the cable made by the conventional wrapping method, the cable 100 of the present invention has the following advantages: first, the roundness is significantly higher, and closer to a circle; second, the impedance value is closer to the target value of 105Ω, and the impedance value is more stable; third, insertion loss is less, the authenticity and integrity of the transmission signal is better; fourth, the skew is small, it is less likely prone to misjudgment, and the bit error rate is reduced; fifth, the flexibility/bendability is better, and the service life is longer; sixth, no wrinkles, able to improve the fit and covering of the combination of the first wrapping tape 91 and the second wrapping tape 92 and the conductor 90.

Figure 21:
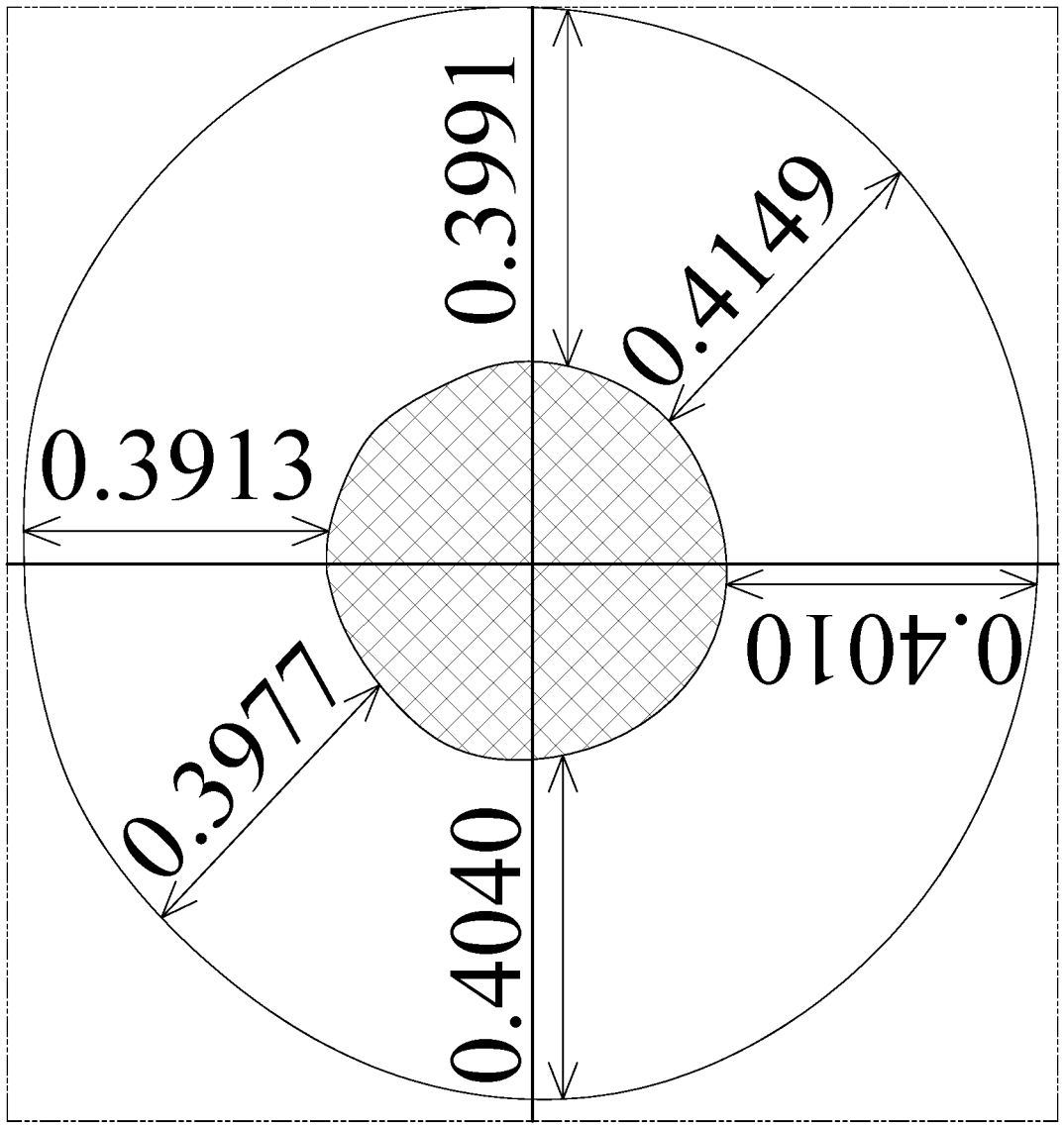
FIG. 21 is a metallographic diagram of the cable of the present invention.

In summary, the double-layer longitudinal wrapping mold of the present invention can provide the first wrapping tape 91 to cover the outer surface of the conductor 90 in a longitudinal wrapping manner, while providing the second wrapping tape 92 to cover the outer surface of the first wrapping tape 91 in a longitudinal wrapping manner. The first wrapping tape 91 and the second wrapping tape 92 are prevented from being wrinkled. Therefore, the first wrapping tape 91 and the second wrapping tape 92 are very flat, which improves the fit and covering properties of the combination of the first wrapping tape 91 and the second wrapping tape 92, and the conductor 90. The above results can be clearly observed from the metallographic diagram in FIG. 21.

Furthermore, the third wrapping tape 93 is continuously wound on the outer surface of the second wrapping tape 92, and the fourth wrapping tape 94 is continuously wound on the outer surface of the third wrapping tape 93. Therefore, the third wrapping tape 93 and the fourth wrapping tape 94 can increase the overall structural strength of the cable 100, and can also prevent the first wrapping tape 91, the second wrapping tape 92, the third wrapping tape 93 and the fourth wrapping tape 94 from problems such as deformation and eccentricity of the conductor 90, improve the roundness and concentricity of the cable 100. The above results can also be clearly observed from the metallographic diagram in FIG. 21.

In addition, compared with cables made by conventional wrapping methods, the electrical characteristics (e.g., impedance value, insertion loss, time difference) and mechanical characteristics (e.g., roundness, wrinkles, flexibility/bendability of the cable 100 of the present invention) is also better.

It is worth mentioning that the cable module 200 further made by using the cable 100 has all the advantages of the cable 100.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A double-layer longitudinal wrapping mold, comprising:
    a base, having an inlet end and an outlet end;
    a first longitudinal wrapping structure, disposed on the base, close to the inlet end of the base, and provided with a first guide hole, a first outer layer wrapping tape hole, and an inner layer wrapping tape hole; the first guide hole penetrating through both ends of the first longitudinal wrapping structure, the first outer wrapping tape hole penetrating through both ends of the first longitudinal wrapping structure and located on one side of the first guide hole, and the inner wrapping tape hole penetrating through both ends of the first longitudinal wrapping structure, located at the other side of the first guide hole, and being wound sideways;
    a first pressing structure, disposed on the base, between the first longitudinal wrapping structure and the outlet end of the base, and disposed with a first pressing hole and a second outer layer wrapping tape hole; the first pressing hole penetrating through both ends of the first pressing structure and having a diameter smaller than the diameter of the first guide hole, the second outer layer wrapping tape hole penetrating through both ends of the first pressing structure and located on one side of the first pressing hole;
    a second longitudinal wrapping structure, disposed on the base, located between the first pressing structure and the outlet end of the base, and disposed with a second guide hole and a third outer layer wrapping tape hole; the second guide hole penetrating through both ends of the second longitudinal wrapping structure and having a diameter equal to the diameter of the first guide hole, and the third outer layer wrapping tape hole penetrating through both ends of the second longitudinal wrapping structure, located on one side of the second guide hole, and being wound sideway;

a second pressing structure, disposed on the base, located between the second longitudinal wrapping structure and the outlet end of the base, and disposed with a second pressing hole and a fourth outer layer wrapping tape hole; the second pressing hole penetrating through both ends of the second pressing structure and having a diameter equal to the diameter of the first guide hole, the fourth outer layer wrapping tape hole penetrating through a front end of the second pressing structure, located on the other side of the second pressing hole, and being wound sideway, with one side penetrating an inner wall of the second pressing hole; and a first necking structure, disposed on the base, close to the outlet end of the base, and disposed with a necking hole; the necking hole of the first necking structure penetrating through both ends of the first necking structure and having a diameter tapered from its inlet end toward its outlet end, with the diameter of the inlet end of the necking hole of the first necking structure equal to the diameter of the first guide hole.

2. The double-layer longitudinal wrapping mold according to claim 1, wherein first longitudinal wrapping structure, the first pressing structure, the second longitudinal wrapping structure, the second pressing structure, and the first necking structure are respectively slidably disposed on the base.

3. The double-layer longitudinal wrapping mold according to claim 2, wherein the base has a sliding groove, and each of the first longitudinal wrapping structure, the first pressing structure, the second longitudinal wrapping structure, the second pressing structure, and the first necking structure is disposed with a sliding block, a guide portion, and a first fastener; the sliding blocks are slidably disposed on the sliding groove and each is disposed with a through hole and a first fixing hole respectively, the guiding portions are respectively disposed in the through holes of the sliding blocks, the first fasteners respectively pass through the first fixing holes and fasten the guiding portions on the sliding blocks; and wherein the guide portion of the first longitudinal wrapping structure is disposed with the first guiding hole and the first outer layer wrapping tape hole and the inner layer wrapping tape hole, the guide portion of the first pressing structure is disposed with the first pressing hole and the second outer layer wrapping tape hole, and the guide portion of the second longitudinal wrapping structure is disposed with the second guiding hole and the third outer layer wrapping tape hole, the guide portion of the second pressing structure is disposed with the second pressing hole and the fourth outer layer wrapping tape hole, and the guide portion of the first necking structure is disposed with the necking hole.

4. The double-layer longitudinal wrapping mold according to claim 2, wherein the base is disposed with a plurality of second fixing holes, a plurality of second fasteners respectively penetrate through the second fixing holes, and respectively fasten the first longitudinal wrapping structure, the first pressing structure, the second longitudinal wrapping structure, the second pressing structure and the first necking structure to the base.

5. The double-layer longitudinal wrapping mold according to claim 2, wherein a sliding rail is protruded on two sides of the base, and a guide groove is provided respectively on each of two sides of the first longitudinal wrapping structure, two sides of the first pressing structure, two sides of the second longitudinal wrapping structure, two sides of the second pressing structure, and two sides of the first necking structure, and the guide grooves are respectively slidably disposed on the two sliding rails.

6. The double-layer longitudinal wrapping mold according to claim 1, wherein the sideway winding of the inner layer wrapping tape hole is defined as follows: the inner layer wrapping tape hole gradually approaches the first guide hole from its inlet end to its outlet end, and one side of the inner layer wrapping tape hole penetrates an inner wall of the first guide hole, and an arc length of the inner layer wrapping tape hole is gradually reduced.

7. The double-layer longitudinal wrapping mold according to claim 1, wherein the sideway winding of the third outer wrapping tape hole is defined as follows: the third outer wrapping tape hole gradually approaches the second guide hole from its inlet end to its outlet end.

8. The double-layer longitudinal wrapping mold according to claim 1, wherein the sideway winding of the fourth outer wrapping tape hole is defined as follows: the fourth outer wrapping tape hole gradually approaches the second pressing hole from its inlet end to its outlet end, and one side of the fourth outer layer wrapping tape hole penetrates the inner wall of the second pressing hole from its inlet end to its outlet end, and an arc length of the fourth outer layer wrapping tape hole is gradually reduced.

9. The double-layer longitudinal wrapping mold according to claim 1, wherein the position of the outlet end of the third outer layer wrapping tape hole and the position of the inlet end of the fourth outer layer wrapping tape are opposite to each other.

10. The double-layer longitudinal wrapping mold according to claim 1, further comprising a second necking structure, disposed on the base and located between the second longitudinal wrapping structure and the second pressing structure, disposed with a second necking hole; the second necking hole of the second necking structure penetrating both ends of the second necking structure and having a diameter tapered from the inlet end to the outlet end of the second necking structure; the diameter of the inlet end of the second necking hole being equal to the diameter of the first guide hole.

* * * * *